United States Patent [19]

Scalzi et al.

[11] Patent Number: 5,577,231
[45] Date of Patent: Nov. 19, 1996

[54] STORAGE ACCESS AUTHORIZATION CONTROLS IN A COMPUTER SYSTEM USING DYNAMIC TRANSLATION OF LARGE ADDRESSES

[75] Inventors: Casper A. Scalzi, Poughkeepsie, N.Y.; William J. Starke, Austin, Tex.

[73] Assignee: International Business Machines Corporation, Armonk, N.Y.

[21] Appl. No.: 349,771

[22] Filed: Dec. 6, 1994

[51] Int. Cl.⁶ .................................................. G06F 9/455
[52] U.S. Cl. ........................... 395/500; 395/800; 395/416
[58] Field of Search .......................... 364/200; 395/500, 395/800, 375, 400, 650, 416

[56] References Cited

U.S. PATENT DOCUMENTS

| | | | |
|---|---|---|---|
| 4,785,392 | 11/1988 | Maier et al. | 364/200 |
| 4,843,541 | 6/1989 | Bean et al. | 364/200 |
| 4,945,480 | 7/1990 | Clark et al. | 364/200 |
| 5,109,522 | 4/1992 | Lent et al. | 395/800 |
| 5,210,832 | 5/1993 | Maier et al. | 395/375 |
| 5,230,069 | 7/1993 | Breisford et al. | 395/400 |
| 5,280,592 | 1/1994 | Ryba et al. | 395/375 |
| 5,339,417 | 8/1994 | Connell et al. | 395/650 |
| 5,367,661 | 11/1994 | Hough et al. | 395/500 |
| 5,426,748 | 6/1995 | Brenza et al. | 305/400 |

*Primary Examiner*—Kevin J. Teska
*Assistant Examiner*—Russell W. Frejd
*Attorney, Agent, or Firm*—Bernard M. Goldman

[57] ABSTRACT

A method of using the DAT mechanism in a computer processor to extend both: 1) the native storage access authorization architecture of the processor, and 2) to enable the processor to execute programs designed to operate under different storage access architectures. An executing program (called a source program) uses "source effective addresses" (source EAs) for locating its instructions and storage operands while executing on the processor (called the target processor).

20 Claims, 19 Drawing Sheets

EXPLODED TARGET VIRTUAL EFFECTIVE ADDRESS

EXAMPLE ACCESS CONTROL MECHANISMS

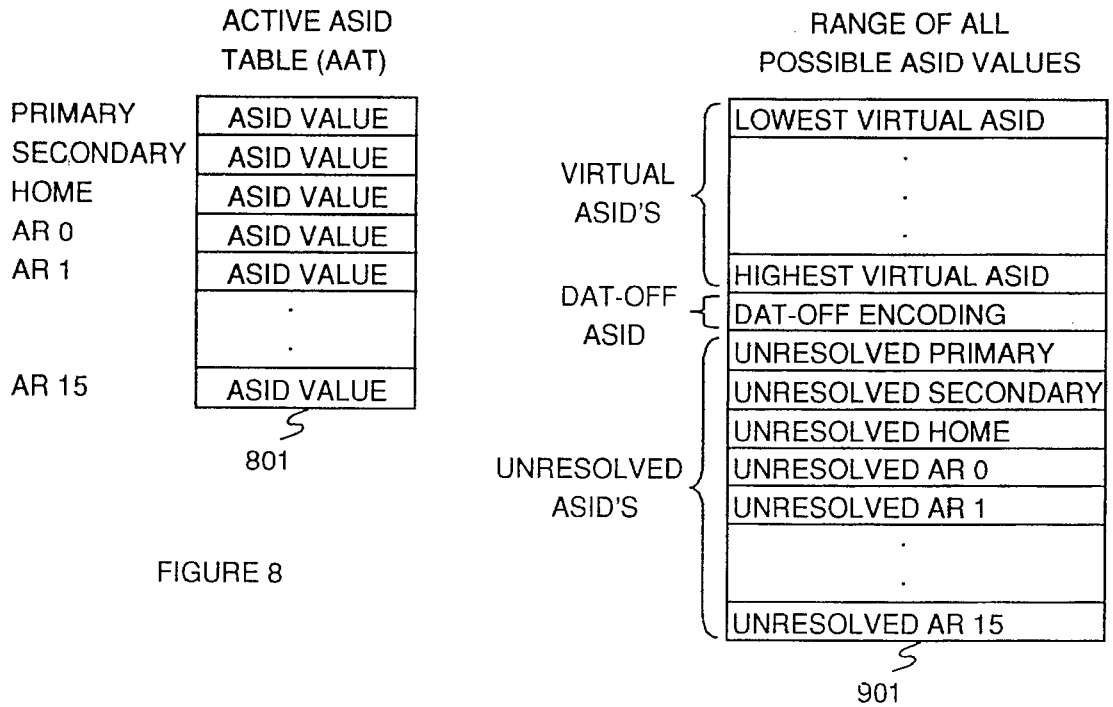
FIGURE 8
FIGURE 9
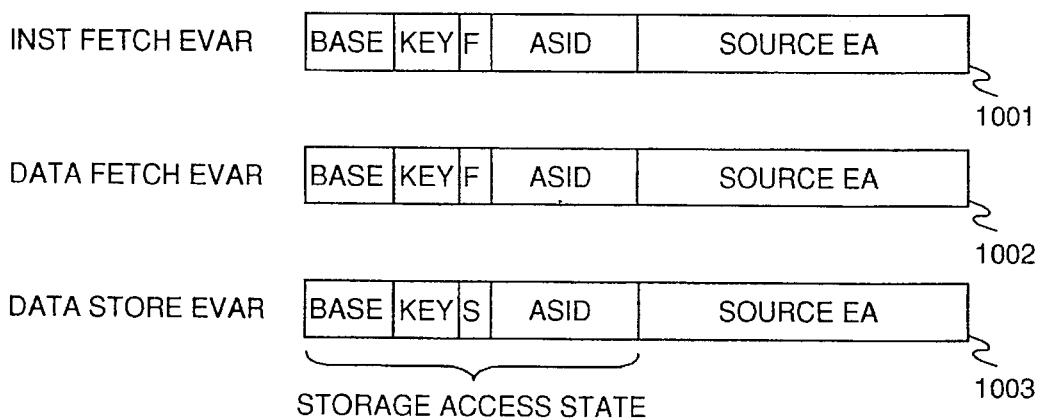
FIGURE 10

TARGET PAGE TABLE ENTRY (PTE)

TARGET PAGE TABLE

STORAGE ACCESS AUTHORIZATION CONTROLS IN A COMPUTER SYSTEM USING DYNAMIC TRANSLATION OF LARGE ADDRESSES

INTRODUCTION

This invention enables unique storage access authority controls to be provided within a processor having dynamic address translation (DAT) controls. These DAT-implemented storage access authority controls can augment a processor's native storage access authorization controls or emulate the storage access authorization controls required by another architecture executing in the processor not containing such controls.

BACKGROUND OF THE INVENTION

Examples of prior access authority controls found in different types of prior computer architectures are: store protection, fetch protection (the scope of such protection may differ, such as by providing it over a segment, page, block of real memory, or a virtual address space). Many current microprocessor architectures support one or more virtual address spaces with some type of controls which constrain accesses to the real and virtual storage of a processor. The IBM S/390 architecture has storage key protection over its real storage page frames (which affects access to its virtual pages which map to the page frames), and address space tokens and storage authorization codes over its virtual address spaces. Such access authority controls are currently implemented by hardware and microcode in the prior and current processor systems.

A need currently exists to execute any program on any processor, no matter how different from the processor was the computer architecture under which the program was written. Currently preventing this objective is the fact that access authority controls implemented in the processor hardware and microcode cannot by used by object programs written for a different computer architecture than that of the processor. Generally the current state of the art is that an object program must be designed and written to execute under the architecture of the processor on which it is designed to execute, unless special emulation means is provided on the processor for the architecture of that program.

Two general types of computer architectures are CISC (Complex Instruction Set Computer) and RISC (Reduced Instruction Set Computer), and each of these architecture types contains many disparate architecture features. For example, the IBM S/390 and the Intel 486 are each CISC types of architecture. The S/390 and 486 platforms are very different from each other, and a program designed to execute on S/390 processors will not execute on 486 processors, and visa-versa. (A computer architecture is sometimes called a computer "platform".)

A recent industry trend exists for migrating programs written for CISC architectures to RISC architectures. This indicates a need to find ways to execute CISC programs on RISC processors.

While most architectures are capable of exhibiting the same computational and logical characteristics, their different architectures typically do not support the same types of access authority mechanisms for providing program isolation, regulating access to sensitive data, etc.

Standard application interfaces have evolved using programming languages (i.e. using source code), through which different processors using the different architecture may support a common programming interface to which application programs may be written. The application may be compiled to different object programs which can execute on different processors designed to use the standard application interface under different computer architectures.

The standard application interface is provided by an application enablement environment, which is a program layer between a kernel program in an operating system designed for that architecture and its application programs (applications).

Services provided by the kernel program have mechanisms and parameters determined by a processor architecture, to insure security of data and data integrity when applications written to the common programming interface are being executed. Some examples of application enablement environments are CICS (Customer Information Control System) on S/390 systems, POSIX (Portable Operating System Interface) on Unix systems, and Microsoft Windows on Intel systems.

An application, if written in a commonly-used high level program language, may be ported among all processors supporting the language by recompiling the application program to the desired processor architecture.

An emulation technique called binary translation can sometimes be employed to convert the object code of some architectures to the executable object code of another architecture. Binary translation has only limited adaptability, in that it reproduces computational and logical characteristics, but not storage access authorization mechanisms.

While these standard interfaces are suitable for migrating some applications among processors which support them, a processor architecture itself limits the interface upon which each kernel program must be written. Since the kernel program must provide services to the application enablement environment by making use of the storage authorization policies enforced by mechanisms inherent in a processor architecture, the kernel program for each architecture must be designed and coded specifically for that architecture, and although high level languages may be employed to some degree to simplify the process, porting of the kernel program from one processor to another usually involves significant rework. The more different one architecture is from another, the more extensive the design and implementation effort.

Furthermore, since a kernel program relies on underlying architectural mechanisms to provide services to the application enablement environment, the ability of a kernel program to support a given environment depends on its underlying architecture. In other words, if two processor architectures support similar access authorization mechanisms, they still may require different kernel programs due to subtle architectural differences. The different kernels may then allow the application enablement environment to port programs from one to the other, since the services provided by the kernel program, whose parameters are defined by their processor architectures, will be similar. In the case of two processor architectures which support dissimilar access authorization mechanisms, however, not only are vastly different kernel programs necessary; but also, due to the dissimilarities in the access authorization mechanisms provided, it is likely that the implementation of a given application enablement environment on the two processors will require a different design approach for each processor architecture. If the application enablement environment is designed to utilize some of the specific mechanisms provided in one processor architecture, which have no equivalent in the other processor architecture, it may still be possible to provide the same application interface on both systems, but impossible to provide the same level of security and data integrity in the application enablement environment implementation for both systems.

The differences in many architectures illustrate this point, e.g. one CISC to another CISC, CISC to RISC, RISC to CISC, and one RISC to another RISC. Application interfaces and their underlying application enablement environments designed for access authorization mechanisms typically found in RISC architectures can often be ported between processors having different RISC architectures. They may sometimes be implemented on CISC processor architectures, although this may require a re-design of the application enablement environment to interface the CISC kernel program. Application interfaces and their underlying application enablement environments designed for the more elaborate access authorization mechanisms typically found in CISC architectures must be re-designed when they are implemented on RISC processors. If the target RISC processor is incapable of providing the function of the CISC authorization mechanisms, the resulting implementation will not reach the level of security and data integrity provided on source CISC implementations. The industry trend of migrating applications, written to such application interfaces, from CISC architectures to RISC architectures brings with it the challenge of preserving the level of security and data integrity expected by the users of these applications. In addition, the lack of portability of application enablement environments and kernel programs between such diverse processor architectures makes such migration an expensive venture.

New risks to computer security and its data integrity are often ignored when an application enablement environment is re-designed to the interface provided by the kernel program on another target processor architecture. Applications are then re-compiled to the new interface or emulated via binary translation of the program code. The risks and exposures associated with this method vary from application to application, and in some cases, are quite undesirable. Also, the expense associated with migrating the application enablement environment from one hardware architectural platform to another is substantial.

An even more costly alternative is to re-design an application suite of programs to a different application interface provided by an application enablement environment that already exists for the target processor. It is possible that an application enablement environment designed for simpler access authorization mechanisms provided by a target processor may utilize the simpler mechanisms to attain a level of security and data integrity that approaches that of the source CISC architecture. While this approach may alleviate many of the risks and exposures associated with the first approach, the expense is such that it is misleading to characterize it as a form of migration, since migration implies some level of savings over a first-time development effort, whereas the expense of this approach of re-designing and re-implementing the application suite may be comparable to that of a first-time development effort.

Software emulation is one solution which may provide access authorization mechanisms of a source CISC architecture, while eliminating the need to migrate the applications, the application enablement environment, or the kernel program. In this approach, a software layer is placed between the source kernel program and the target processor architecture which exhibits the authorization characteristics of the source processor architecture. However, since architectural authority mechanisms are typically associated with system state, their effects permeate the operational aspects of the architecture, and are implicitly realized in a large fraction of the operations supported. This means that a straight forward software implementation of such mechanisms will incur a software pathlength penalty each time such an operation is executed. Due to the aggregate effects of such penalties, this method suffers from substantial performance degradation, which is usually prohibitive.

One method for alleviating some of the performance degradation associated with software emulation is to emulate only the computational and logical characteristics of the source processor architecture. This, however, means that the level of security and data integrity is once again compromised (since the access authorization mechanisms are not being emulated), and that the kernel program or application enablement environment must be migrated (since the instructions in the source processor architecture that are utilized by the kernel program are not being emulated). This is essentially the same as the first approach described, employing the binary translation technique to emulate application behavior.

Another method for alleviating performance degradation associated with software emulation is employing hardware emulation instead, or some combination of software and hardware emulation. Typically, the computational and logical characteristics of the source CISC architecture instructions can be expressed by sequences of target RISC architecture instructions (much like vertical microcode), without substantially changing the target hardware. In some instances, if the intent to migrate programs between the architectures is strong, it may justify such hardware changes. However, the implementation of the source access authorization mechanisms in target hardware typically requires substantial hardware changes. The additional hardware development expense associated with this method of implementing CISC on RISC prevents such a hybrid solution from becoming a cost-effective replacement for RISC processors.

SUMMARY OF THE INVENTION

This invention provides a novel method of implementing access authority mechanisms in a processor system, by using an existing DAT mechanism available on many prior and current processors. Although this invention may not modify the DAT mechanisms of a processor, some embodiments of this invention may choose to provide hardware and/or microcode for detecting new access authority codes in the processor operations. These DAT-implemented access authority mechanisms may be used to expand the processor's native architecture (i.e. architecture originally designed into the processor), or to support emulation of access authority mechnisms for programs using different architectures on a processor.

This invention enables a target processor (built with a target architecture designed into the processor) to execute source programs designed for an architecture different from the target architecture which does not support access authority controls of the different (source) architecture required for proper execution of the source programs. This invention enables the target processor to receive codes representing the source architecture's access authority mechnisms by utilizing the existing DAT mechanism (unmodified) of the target architecture when the target processor uses storage addresses larger in size than the source program's storage addresses.

Thus, this invention provides processes which utilize the DAT hardware found in many current processor designs using disparate computer architectures (both CISC and RISC types), in ways not intended by their original design, to support access authorization mechanisms found in unrelated architectures.

A processor executing a program is herein called a "target processor", and it is designed to enforce rules of a "target architecture". The executing program is herein called the "target program".

This invention enables a target processor to execute a program, herein called a "source program". A "source program" is herein defined as a program written for a processor architecture which is alien to the architecture of the target processor. A "source program" contains instructions, operating states and requires executing facilities not found in the target processor architecture. In this specification, the term, source program, is therefore different from, and should not be confused with, a common use of the term "source program" as a program in a high-level language distinguished from the same program in executable object code form. The source program is designed to use "source access authority mechanisms" defined by a "source architecture". The "source architecture" is not originally designed into the target processor and is not defined by the target architecture. Examples of access authority mechanisms found in many different types of computer architectures are: store protection, fetch protection, storage key protection, virtual address space identifier protection, etc., and other constraints on storage accesses into virtual and real storage of a processor.

This invention enables a target processor to enforce the rules of many "source access authority mechanisms" (defined in many different source architectures) to augment constraints in target processor execution of a source program. The target processor adapts the source access authorization mechanisms when executing a source program by modifying the way the dynamic address translation (DAT) mechanism is used in the target processor.

The source access authorization mechanisms may be enforced in the target processor to meet security and data integrity requirements of the source architecture, while providing a common interface to a "source kernel program" which may be concurrently executing in the target processor.

Being able to execute source programs on inexpensive target processors may reduce execution expenses for moved applications, application enablement environments, and kernel programs. The source access authorization mechanisms in the target processor may operate with little performance degradation, and, depending on the embodiment, may not require any change to the target processor hardware.

Although the target processor need not have the source access authorization mechanisms (replaced by this invention), this invention requires that the target architecture must support a target virtual memory many times larger than the source virtual memory. This requires that the size of the target virtual effective address must be larger than the size of the source effective address, real or virtual.

Several recently released micro-processors have an address size of 64 bits which can handle most of the commonly used source virtual effective addresses, since they do not exceed 32 bits in size for programs written for prior processors. The 64 bit size is used herein in the preferred embodiments in this specification as the target virtual effective address size—but that particular size is not required by the invention. It is not essential that the target processor have a 64 bit effective address size, as long as the target address size is substantially larger than the source effective address size.

The target architecture supporting a dynamic address translation (DAT) mechanism in the target processor uses uniform units of virtual storage, called pages, which are dynamically backed by equal size units of real storage, called page frames. The size of the pages and page frames in the source architecture should not be greater than, but may be equal to, the size of the pages and page frames in the target architecture. A source page is mapped into a target page, and a source page frame is mapped into a target page frame. Therefore, if the target pages and page frames are larger in size than the source pages and page frames, their excess amount greater than the source pages and page frames may be wasted. The majority of currently used processor architectures use a 4096 byte virtual page and real page frame size. The preferred embodiment presumes the 4096 byte size for pages and page frames in both its source and the target architectures.

This invention enables an executing processor's DAT mechanism to translate a source DAT ON or OFF page into a plurality of target virtual pages which may be translated to the same page frame in real storage. Each target virtual page is used to represent one combinatorial set of access authorization states existing during one access of a translated page frame in real storage. All target virtual pages translating to the same target page frame (in real storage) may herein be called "synonym" source virtual pages.

A prior use of the phrase "synomym pages" exists for different virtual addresses in different address spaces which are mapped to the same real page frame. The source emulation technology of this invention applies the phrase "synonym pages" to those source pages with different storage access constraints (that provide different target virtual addresses) that are mapped to the same real page frame.

This invention:

1) Appends one or more new access authority codes to each source effective address being generated in a processor in order to expand (explode) the address of a source page with the new access authority codes.

2) The DAT mechanism of the processor translates the exploded source virtual address and must take one of two possible actions when a source real or virtual storage access is requested:
   A) If the exploded virtual address is currently mapped to a target page frame by the addressing controls of the processor, the storage access proceeds uninhibited.
   B) A page fault exception signal results if the exploded virtual address is not mapped to a target page frame. A page fault initiates a checking operation in the processor for detecting the access authorization codes put into the exploded virtual address by this invention. The access authority codes in the exploded virtual address represent access authority states in the source program.

It is therefore an object of this invention to provide an efficient method and means for a computer to augment access control mechanisms in a processor for either or both of the native architecture of the processor or a foreign architecture being emulated on the processor. This invention enables the addition of more stringent data integrity controls than originally provided in a processor system by its original architecture.

It is another object of this invention to provide general and uniform means to assure that a source program's storage accesses comply with source architectural constraints under which the source program is expected to be executed when the source program is executed on a target processor having a different access control architecture.

It is another object of this invention to perform source system storage accesses in a target system's storage at full target processor speed, when the accesses are made from a previously validated source storage access state, including direct use of the target processor DAT hardware, data cache and/or dynamic address translation lookaside buffers.

It is another object of this invention to have a target computer provide another computer's more complex storage access authority checking, without the target computer being designed to contain the more complex storage access authority checking of the other computer.

It is another object of this invention to have a target processor behave as a source processor, when the target processor executes a source program, in which the target processor performs storage access authority checking for the source program according to the source architecture of the source program, for which the target processor uses a combination of: virtual addressability larger than the source, and appropriate programming of the addressing facilities of the target processor.

It is another object of this invention to use extended (exploded) virtual effective addresses in a target machine to represent, in composite, source program access states and source program logical storage addresses for source programs designed to execute under a different computer architecture.

It is another object of this invention to extend (explode) the effective addresses in a processor to augment the storage access authorities used by a an executing program, wherein a new source access authority state may be later added to the processor for improving the data integrity requirements of processor operations.

It is another object of this invention to have a target system to augment executing source addresses with new access authority codes, for mapping the new access authority states to different target virtual storage locations.

It is another object of this invention to map multiple synonym target virtual addresses to the same real storage page frame address.

It is another object of this invention to provide separate subfields in an extended (exploded) virtual effective address to represent added access authority controls not present in the original design of a processor.

It is another object of the invention for a processor to operate in unintended ways to execute programs designed for incompatible processor access authority contols, without changing the processor hardware.

It is another object of the invention to enable source programs to execute on a target processor, without changing the source programs.

It is another object of the invention to enable source programs containing not greater than 32 bit effective addresses and requiring access authority controls not originally provided in a target processor to execute on the target processor without changing the source programs or the target processor, when the target processor has much larger effective addresses (e.g. 64 bit addresses) which are translated by DAT.

The invention may be implemented in a target machine in a variety of ways, from a programmed software implementation to a full hardware and horizontal microcode processor implementation. This invention comprehends all of these media for implementing its processes. Also, the invention can be applied on target processors to augment their native hardware access authorization control facilities to execute programs designed to newer versions of the same architecture having added access authorization controls. These may be used like the native hardware facilities in the target processor in executing programs for the augmented native architecture.

The invention also may be used for augmenting the execution of programs of a different source architecture whose operation may be partly supported on that target processor by using the methods of this invention. Thus, if a target processor contains specific access authorization mechanisms equal to those of the source architecture, they may be directly used instead of target exploded virtual storage to reflect corresponding source machine access states, and the exploded virtual storage may then only be used to augment the source architecture for access control mechanisms not supported in the target processor.

This invention is invoked each time a source machine effective address has been generated during source program execution, and before it is used to access storage. A storage access state field, representing the current state of the executing source program, is concatenated in front of the source effective address to form a large target machine effective virtual address. The target processor executes a "source address generation process" which generates a "source effective address" (source EA), and also generates "source state indicators" that indicate the current source access authorization states as defined by the source architecture. This process is invoked for each source instruction and operand address encountered. The "source EA" is generated by the source architecture's effective address generation process; every computer architecture defines an effective address generation process. The generated source EA addresses a byte location in a source address space (source AS) containing the executing program and/or a source operand being requested during the source program execution.

The source state indicators, which are generated by the source storage address generation process in the target processor, indicate the current operating state defined by the source architecture (being emulated in the target processor) of the executing program. The contents of the source state indicators are defined by the different source access authorization mechanisms defined in the source architecture, which for example may be the IBM S/390 architecture. The S/390 architecture defines access authorization constraints which use hardware registers and fields in processor real storage for containing indications representing the current access states representing the environment of the executing source program. In the S/390 architecture, the current operating state is indicated by the contents of a PSW (program status word), control registers (CRs), general registers (GRs), associated access registers (ARs), and real storage keys.

The extended target virtual addresses, in which different target addresses are used to address a single source location, one target address for each source storage access state of an access are called "exploded" target virtual addresses. This is because each source address is transformed to one of a very large number of possible target virtual addresses, depending on the state of the access control variables at the time of execution, for accesses to source machine storage as represented in the target machine storage. All accesses to source real storage made by processes of the target machine in providing source program execution are made using a target exploded effective virtual address.

This invention generates a "target exploded VEA" by combining the "source EA" and the "source state indicators". The preferred combining technique is to concatenate the "source EA" and the "source state indicators" as respective fields in a target register or in real storage. Subfields in "source state indicator field" receive pre-defined source state indicator codes representing the current operating state of the access authorization mechanisms for the source program existing when the target exploded address is being generated.

The target architecture may for example be the IBM PowerPC RISC architecture operating in a target microprocessor, which has a 64 bit virtual address. If the source program is using the S/390 architecture's access authorization mechanisms, the S/390 effective address requires 31 bits of the target 64 bit virtual effective address, leaving 33 bits (64–31) of the target virtual effective address for use as an appended part. Then the target virtual effective address is interpreted by the target DAT as the "exploded virtual effective address" of this invention.

A major advantage of this invention using a PowerPC microprocessor (or any processor having a 64 bit virtual address) is that no modification is needed to the hardware to handle this invention, due to the availability of the 33 bits in the target virtual address (beyond the 31 bits in the source effective address) for indicating the source storage access authorization states in the exploded virtual effective address, which is then applied to the DAT feature of the microprocessor.

The exploded VEA addresses a byte location 104 (see FIG. 1) in a "target virtual address space" (target VAS). Since there may be many target VEAs for each source EA, it will be realized that the overall size of the target VAS must be many times greater than the size of the source VAS containing the source EA location 101A.

The preferred embodiment uses a DAT (dynamic address translation) process for detecting and handling exploded VEAs to enable a target processor to enforce source architectural rules over a source program executing on the target processor operating under a different architecture. The conventional DAT in the processor may use any type of DAT operation, such as hashing each exploded VEA value to an index that locates a page table entry (PTE) in a page table (PT) and a TLB (translation lookaside buffer) entry in a TLB. Target processor performance is improved by using a conventional TLB to contain the most recently accessed PFRAs (page frame real addresses) and a representation of their associated exploded VEAs.

The invention allows full use of a conventional hardware TLB, which records the most recent virtual-to-real address translation performed by the processor DAT mechanism. If a translation is found in the TLB, the more time-consuming search of the PTE's in system storage is avoided. If a required translation is not found in the TLB, the PTE's are examined in a conventional way to find a valid address translation. If a valid translation is found in either the TLB or PT, the exploded address has been validated previously, and the processor may use the translation directly in its conventional instruction processing without additional steps. However, if the exploded address whose tranlation is required is not found in a valid TLB entry or PTE, a logical page fault condition has occurred. Such a page fault may signal that the validity of the access under source architecture must be checked under the rules of that architecture. This will happen each time a first access is made to source machine storage under a particular storage access state. If the access is valid under source machine rules, a PTE can be established for the target virtual exploded address translation to source real location address. All reference to that source location in the same source system access state by target instructions of a source instruction translation will operate at full target processor speed as long as the assigned PTE remains valid.

If after a logical page fault on the target machine, the source machine rules determine that an access is not valid, the appropriate source action is invoked as specified by the source architecture. For example, the source machine may determine that a source page fault has occurred, in which case a source machine page fault event is generated, or the source machine may determine that a source storage violation has occurred, in which case the appropriate source architecture specified action is taken.

Many target VEAs representing different source states may exist for the same source EA, since one source EA may support many exploded VEAs; one for each state in which it may be accessed. The effect is that the resulting exploded VEAs access different target virtual locations and they locate different PTEs in the page table. But these different PTEs will translate to the same real storage PF in the target storage.

In the definition of the target processor architecture, a virtual address must be established in a defined page table of the processor in order for each access to be resolved. Then a page fault will occur on any access to a virtual address that has not been established in a PTE of that processor. Using different exploded VEAs for each source storage access state allows the target system's page fault mechanism to be used to validate each source access and to cause the checking for legality of all of the access authority states for that access.

Therefore, any future source storage access to the same source page addressed by a source EA, while having the same source storage authorization states, will resolve to the same target storage PF through the same PTE, due to having a single target VEA combining the storage authorization states and the source EA. This relationship between the exploded VEA and its assigned PF lasts only as long as the PTE is valid and associated with that exploded VEA, because the PTE is the only logical connection between that exploded VEA and its assigned PF.

If the target system reassigns a PTE to another exploded VEA, then a non-valid condition is caused by a subsequent access to the VEA previously defined by the PTE, since no PTE then defines that VEA's translation to a real address. This causes the access, including its source system access states, to be checked before access is allowed. Different DAT processes are known in the prior art. One DAT process may use a hashing operation on the exploded VEA to locate the PTE in its page table, and then the validation is not complete until an equal comparison is obtained between bits in the exploded VEA and bits in a corresponding field in the PTE and valid bit. Such validation is conventional. Another DAT process may eliminate the comparison operation, such as the S/390 DAT process, which uses a translation table comprising segment and page tables for accessing the PTE, in which case only the setting of a valid bit in the PTE is tested. In other words, the subject invention is independent of the target DAT implementation.

If the PTE validation operation fails during the DAT operation, then the PTE 105 does not represent the exploded VEA; and a page fault exception signal is generated by the DAT process.

A subsequent access to an already validated exploded VEA backed by a target PF occurs at maximum hardware storage access speed, using any and all hardware mechanisms provided by the target hardware. Such target processor hardware may include TLBs (translation lookaside buffers) 108 which contain essentially the same information as in associated PTEs. The valid TLB entry is used instead of the associated PTE because the TLB hardware is faster than the slower processor storage of the target processor. As long as a particular exploded VEA/PF address mapping remains in a target TLB, all references to source real storage through the exploded VEA (i.e. target virtual address) occur at full hardware speed.

Any target exploded VEA (i.e. exploded address) subsequently used, which maps to the same PF will operate at full hardware speed as long as the connecting PTE 105 is not changed.

Accordingly, this invention can transform each source page address into a very large number of target exploded virtual page addresses, with the number being equal to the number of access authorization states occurring for the source page address. After each exploded VEA is accessed in a PF, its PTE is retained in the page table until it is reassigned to a different exploded virtual page address, usually when it is not frequently used—as determined by a replacement algorithm such as the well-known LRU algorithm. This will also occur if the PF is reassigned to a new use during operation for any reason.

Since multiple target virtual addresses will represent a single source real storage address, one for each storage access state in which the addressed location is accessed, the invention requires logic to control the consequences of the multiple-virtual-to-single-real mapping. This may be implemented by maintaining a list for each page of source real storage. Each list contains an entry for each target virtual page, whose mapping is currently maintained in the target processor page table, that is mapped to the target real storage page representing the source real storage page. Potentially, the total number of lists is equal to the number of source real storage pages. However, the maximum number of entries on all of these lists is equal to the total number of virtual pages that can be maintained at any one time by the target machine page table. Thus, the size of this multi-list structure scales with the size of source real storage and the size of the target page table.

The method of this invention allows a target system having a relatively simple storage authority architecture to execute programs written to run under another architecture which may have more complex access authorization control requirements that are incompatible with those of the target processor architecture. This invention bridges over that architectural incompatibility. The minimum requirements of the target architecture is that it must support a total virtual address space much larger than the total address space of the source architecture, in order to support multiple target virtual pages for each source page. This constraint generally means that the target system must use an address size larger than the address size of the source system. This constraint is easily met in using currently planned microprocessors, such as the IBM PowerPC processor which uses 64 bit addresses. The size of the source addresses is increased by the size of the storage access authority indicator fields added to each source address to convert it into a target virtual address which is required to allow use of the source address in a target system.

Many conventional source systems have incompatible storage access authorization architectures. This invention allows incompatible source access authority mechanisms of a source architecture to be emulated on a target system having a target architecture that does not support these source access authority mechanisms. This invention obtains compatibility by trading complex access authority mechanisms of a source architecture for a unique target process used to manage a large virtual storage in the target system to provide the effect of these mechanisms.

SUMMARY OF THE DRAWINGS

FIG. 8 shows an AAT (active ASID table).

FIG. 9 represents a range of all possible ASID values in a source architecture (S/390).

FIG. 10 represents different types of EVARs (effective virtual address registers).

DETAILED DESCRIPTION OF THE INVENTION

Figure 1:
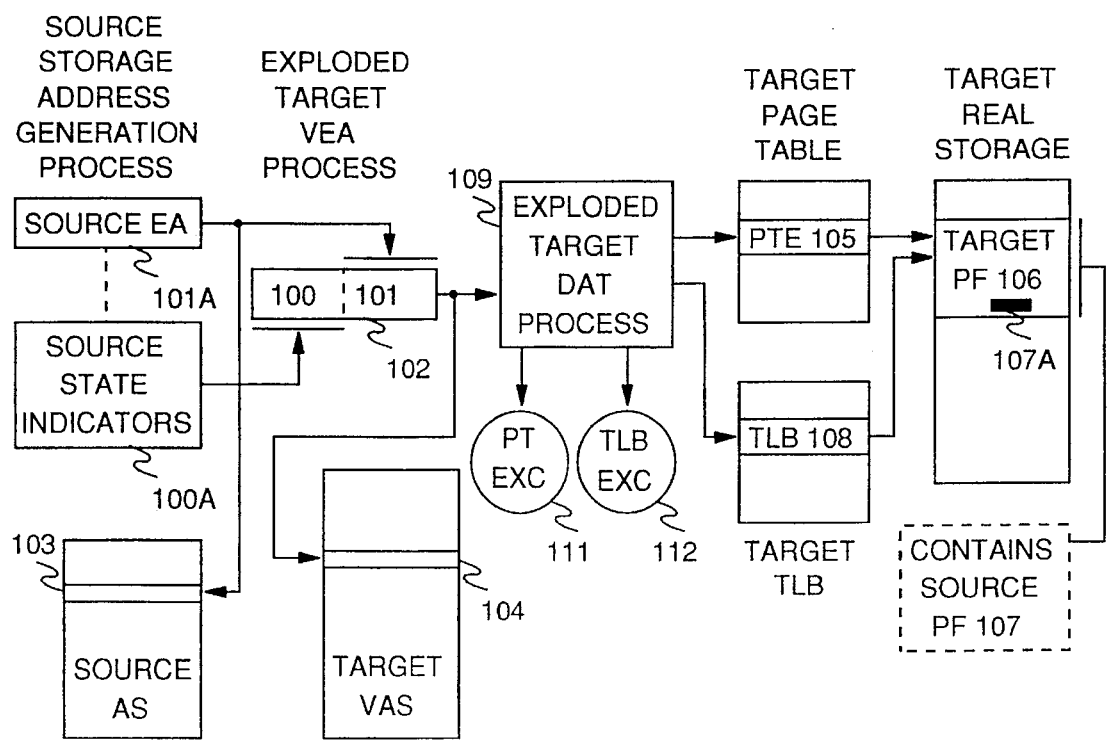
FIG. 1 represents a fundamental process used in this invention.

FIG. 1 illustrates the concept of this invention, which is invoked each time a source address is provided by a source program executing in a target processor.

While executing a program using a source architecture, the target processor's execution logic executes a "source storage address generation process" which generates a "source effective address" (source EA), and "source state indicators" that indicate the current source operating states (as defined by the source architecture being emulated in the target processor). The source program (executing in the target processor) invokes this process for each instruction and operand address encountered in an executing source program. (Every computer architecture defines an effective address generation process).

A generated source effective address may be a source real storage address, or it may be a source virtual storage address, depending on the current operating mode established by the source machine program.

Each generated source EA addresses a byte location in source storage containing the executing program and/or operand being requested during the source program execution.

The source state indicators (which are generated by the source storage address generation process in the target processor) indicate the current operating state defined by the source architecture (being emulated in the target processor) of the executing program. For example, the source architecture may be the IBM S/390 architecture, and the target architecture may be the Intel 486 CISC architecture or the IBM PowerPC RISC architecture operating in a target microprocessor. Each of these architectures defines hardware registers and fields in processor real storage for containing indications representing the current operating state of a program executing under the respective architecture. In the S/390 architecture, the current operating state is indicated by the contents of a PSW (program status word), control registers (CRs), general registers (GRs), associated access registers (ARs), and real storage keys.

As FIG. 1 shows, an "exploded target VEA process" operates with the "source storage address generation process" to write the generated source EA 101A into a "source EA" field 101 in an "exploded target VEA register" 102. Register 102 may be a hardware register, or may be a predetermined area in target processor real storage.

All source effective addresses generated by the source storage address generation process, whether real or virtual, are converted to exploded target virtual effective addresses (VEA) to be used by target instructions performing the function of the source instruction being executed. The source address generation process includes all types of computation specified, in source architecture, to be performed on instruction-specified addresses to prepare the effective address to be used to actually make the access. For example, in S390 systems, this can include the addition of the contents of the Base General Purpose Register (GPR), the Index GPR, and the displacement quantity, all as specified in the S/390 instruction. This is termed the B, X, D calculation. All three elements are not present in the definition of all S/390 instructions however, and this is accommodated in the target machines source address generation process.

Figure 3:
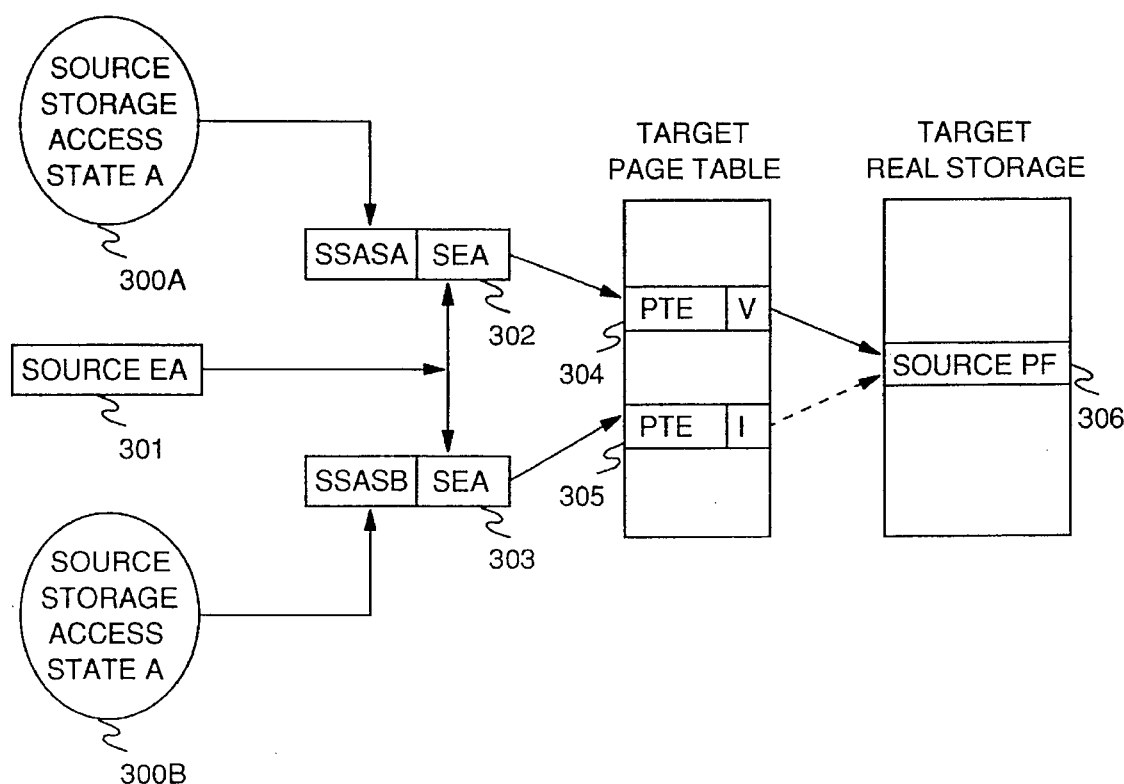
FIG. 3 shows the mapping of plural exploded virtual effective addresses to the same real page frame.

After a source machine effective address has been generated by any process, and before it is used to access storage, source state indicators 100A are combined with the source effective address, by concatenation in front of it in field 100 to form a large target machine effective virtual address maintained in 102. This latter address is then used to access a source operand in target virtual storage 104. FIG. 3 shows an example of two accesses, possibly by different programs, each of different storage access state, accessing the same source virtual location 301. One access is depicted as being made in state A, 300A, while the other is being made in state B, 300B. The effect is that the target virtual locations being accessed are different for the two accesses. The target machine virtual addresses 302, 303 will be resolved by two different page table entries 304, 305, but will resolve to the same real storage location 306 in the target machine, since, in fact, the two accesses are to the same source location. As shown in the figure, the two Page Table Entries (PTE's) address the same real location, that which represents the addressed source real location. Since, in the definition of the target machine operation, a virtual address must be established in a defined page table of the machine in order for an access to be resolved, a page fault will occur on any access to a virtual address that has not been so established in a page table entry (PTE) of that machine. Using a different target virtual address for each source storage access state from which an access could possibly be made during source program execution allows the target machine page fault to be used as the impetus to validate access by each specific storage access state to any source location.

The storage access state of the target VEA reflects the access state under which the access is being made. A page fault signals that the validity of the access with that access state is yet to be checked. As a part of the validity check, source Dynamic Address Translation (DAT), including placement of the source address into the specified source address space when source address is virtual, is performed. If the access is valid, a PTE is assigned for the translation of the VEA to the proper target real address representing the accessed source storage real location. In any case, a subsequent reference to a source real storage location from a previously validated source effective address and source storage access state combination, occurs with full hardware storage access performance, using any and all hardware mechanisms provided by the target hardware. As long as a particular target-virtual-to-real address mapping remains in a target PTE, all references to source real storage through that target virtual address value occurs at full hardware speed.

In FIG. 1, the "exploded target VEA process" operates with the "source storage address generation process" to write the current operating state into a "storage access state" field 100 in the "exploded target VEA register" 102. This is done by using a set of subfields in field 102 in which is written pre-defined source state indicators representing the current operating state of the source program when an address is being processed.

Thus, field 100 receives a set of source state indicator bits representing the current source architectural state. For example, if the source architecture is the S/390 architecture, all of the bits in field 100 will indicate the current S/390 architectural state under which the source instruction is to be executed.

The contents of the two fields 100 and 101 are concatenated in register 102 to provide a single virtual address, herein called an "exploded target virtual effective address" (exploded target VEA), which is the heart of the subject invention. This invention makes non-address bits (the source state indicating bits) into address bits for the special purposes of this invention. It is important to this invention that this concatenation causes the same source EA value to have plural different exploded target VEA values according to the different source operating states that may exist for the same source EA.

For example, the same source EA may indicate a current fetch or store operation—among many possible states of the access. The fetch state for the source EA will provide a different exploded VEA value from the store state, for the same source EA. These different VEAs enable the target processor (even though using a different architecture) to recognize the source fetch state from the source store state for the same source EA. Recognition of this state difference for the same source EA enables the target processor to intervene, if necessary, to block a current store access from writing in a memory area if it finds the current access is an access store protected storage.

The source EA is either a real or a virtual address. It is an access into source real, or a virtual address that must be translated by source DAT before being used for the access. The source EA addresses a byte location 103. Since there will be many target VEAs for each source EA, it will be realized that the overall size of the target VAS must be many times greater than the size of the source AS containing the source EA location 103.

The preferred embodiment uses a DAT (dynamic address translation) process 109 for detecting and handling exploded VEAs to enable a target processor to enforce source architectural rules over a source program executing on the target processor operating under a different architecture. In FIG. 1, each exploded VEA in register 102 is provided to DAT process 109, which may be a conventional DAT type of operation such as hashing each exploded VEA value to an index that locates a page table entry (PTE) in a page table (PT) and a TLB (translation lookaside buffer) entry in a TLB. Target processor performance is improved by using a conventional TLB to contain the most recently accessed PFRAs (page frame real addresses) and a representation of their associated exploded VEAs.

As in prior art, the exploded target DAT process 109 is used to translate each received exploded VEA (or its representation) by accessing the TLB for a corresponding valid TLB entry (TLBE). If a valid TLBE 108 is found, its contained PFRA is used to locate a target page frame (target PF) 106 in the target real storage of the target processor. The corresponding search for a valid PTE 105 may be cancelled. If no valid TLBE is found, then a TLB exception signal 112 is generated, and the search of the PT determines if a valid PTE is found. In this invention, if no valid PTE or valid TLBE is found, a storage access state validity check is performed using source access state architecture values. This is caused by a PTE exception signal 111.

Thus, if a valid TLBE or PTE is found, the access is directly made to the target real storage without any interruption. The TLBE or PTE content is used to access the required target page frame (target PF) 106 in the target real storage of the target processor. The target PF will contain the source PF 107 required by the source program address being currently handled. A source byte location 107A in that PF is accessed at the PF address in the source EA.

In the definition of the target processor architecture, a virtual address must be established in a defined page table of the processor in order for each access to be resolved. Then a page fault will occur on any access to a virtual address that has not been established in a PTE of that processor. Using a different target VEA for each source storage access state from which an access could possibly be made during source program execution allows the target system's page fault to be used as the impetus to validate an access by each specific storage access state to any source location.

Thus, in FIG. 1, a source program has a set of storage access states represented by state indicators 100A when requesting an access by a source EA 101A. Indicators 100A and source EA 101A are respectively set into fields 100 and 101 of exploded target VEA 102, which provides a target VEA that resolves all of the source storage access controls in target storage by mapping the target VEAs through the target system's dynamic address translation (DAT) process 109 using PTE 105 that addresses the target real PF location 106, which contains the source PF required by the currently executing source program. The requested source EA resolves to a byte location 107A in the source PF 107 contained in target PF 106 in the conventional manner of locating byte locations in a PF.

After the source storage access states represented by an exploded address has been checked for validity of access, any future source storage access to the same source page addressed by source EA 101A, while having the same source storage authorization states 100A, will resolve to the same target storage PF, due to having a single target VEA 102 combining the storage authorization states 100A and the source EA 101A. This relationship between the exploded VEA and its assigned PF lasts only as long as the PTE 105 is valid and associated with that exploded VEA, because PTE 105 is the only logical connection between that exploded VEA and its assigned PF.

If the target system reassigns PTE 105 to another exploded VEA, then a non-valid condition is caused should the replaced VEA subsequently be accessed again. In such a case that address, which is no longer defined by a processor PTE, causes a page fault and the system access states of the storage reference must be validated anew, and a PTE assigned to the VEA in order to allow the access. The DAT method of the target processor in finding the translation of a VEA to a real address is not a subject of this invention. Any conventional technique is usable.

A subsequent access by an exploded VEA of a validated PF occurs at maximum hardware storage access speed, using any and all hardware mechanisms provided by the target hardware. Such target processor hardware may include TLBs (translation lookaside buffers) which contain essentially the same information as in associated PTEs, including validation information. The valid TLB entry is used instead of the associated PTE because the TLB hardware is faster than the slower processor storage of the target processor. As long as a particular exploded VEA/PF address mapping remains in a target TLB, all references to source real storage through the exploded VEA (i.e. target virtual address) occur at full hardware speed. When a PTE is reassigned, the TLB entry for the displaced VEA must be invalidated.

The target exploded VEA (i.e. exploded address) may then be repeatedly used for different later executing exploded addresses which map to the same PF, as long as their connecting PTE 105 is not changed. Thus, different exploded addresses that map to the same PF will operate at full hardware speed.

Accordingly, this invention can transform each source page address into a very large number of target exploded virtual page addresses, with the number being equal to the number of access authorization states occurring for the source page address. Once a PTE is established to define a particular VEA, it will remain so defined until it is needed to define a different one. A conventional LRU (Least Recently Used) algorithm can be used. The method of selection and assignment of PTEs is not a subject of this invention.

Since multiple target virtual addresses will represent a single source real storage address, one for each storage access state in which the addressed location is accessed, the invention requires logic to control the consequences of the multiple-virtual-to-single-real mapping. This may be implemented by maintaining a list for each page of source real storage. Each list contains an entry for each target virtual page, currently mapped by a page table entry, that is mapped to the target real storage page representing the same source real storage page. Potentially, the total number of lists is equal to the number of source real storage pages. However, the maximum number of entries on all of these lists is equal to the total number of virtual pages that can be maintained at any one time by the target machine page table. Thus, the size of this multi-list structure scales with the size of source real storage and the size of the target page table.

The method of this invention allows a target system having a relatively simple storage authority architecture to execute programs written to run under another architecture which may have more complex access authorization control requirements that are incompatible with those of the target processor architecture. This invention bridges over that architectural incompatibility. The minimum requirement of the target architecture is that it must support a total virtual address space much larger than the total address space of the source architecture, in order to support multiple target pages for each source page. This constraint generally means that the target system must use an address size larger than the address size of the source system. This constraint is easily met in using currently planned microprocessors, such as the IBM PowerPC microprocessor which uses 64 bit addresses. The storage access authority indicator fields added to each source address to convert it into a target virtual address, which is required to allow use of the source address in a target system, increase the target machine address size required to one that is necessarily larger than a source effective address.

Many conventional source systems have different storage access authorization architectures. This invention allows incompatible source access authority mechanisms of a source architecture to be emulated on a target system having a target architecture that does not support these source access authority mechanisms. This invention obtains compatibility by trading complex access authority mechanisms of a source architecture for a unique target process used to manage a large virtual storage in the target system.

Figure 4:
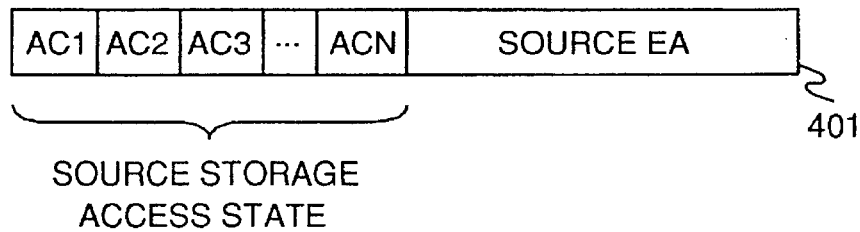
FIG. 4 illustrates access control (AC) fields in an exploded target virtual effective address.

FIG. 4 illustrates the access authorization state indicators as appendage fields AC1–ACn in an "exploded VEA". The settings in these AC fields represent the state of the source storage access authority architecture for the current storage access. This appendage is used to control target storage access operations in a target system.

This multiplicity of AC subfields is concatenated to each source program effective address to form an "exploded virtual effective address". Each of these subfields represents a source access control mechanism, and the content of each subfield contains any of plural codes that represent a state value allowed for that control mechanism in the source architecture. That is, the range of codes in any field is determined by the number of values allowed for that control mechanism in the source architecture. The total of codes for any AC field will correlate with plural values provided in the source architecture for the associated source access authorization mechanism, but the appendage codes need not have the same values as provided in the source architecture for the corresponding mechanism. A kernel or emulation program in the target system interprets these codes.

Subfields AC1, AC2, etc. can be of different size to accommodate the different ranges for their respective codes. Each subfield size is determined so as to contain the full range of access control values for the particular access control mechanism being modelled for the source architecture. Thus the totality of the codes for a subfield respectively represent the totality of source storage-access-states for the associated source access authorization mechanism.

Hence, the method of the subject invention is general and can be used to represent the totality of access control mechanisms in any source architecture and adapt them to corresponding target exploded virtual effective addresses of any target system having the large virtual storage needed to make the target system behave like an incompatible source system for supporting all source access authorization control checking and enforcement.

Figure 5:
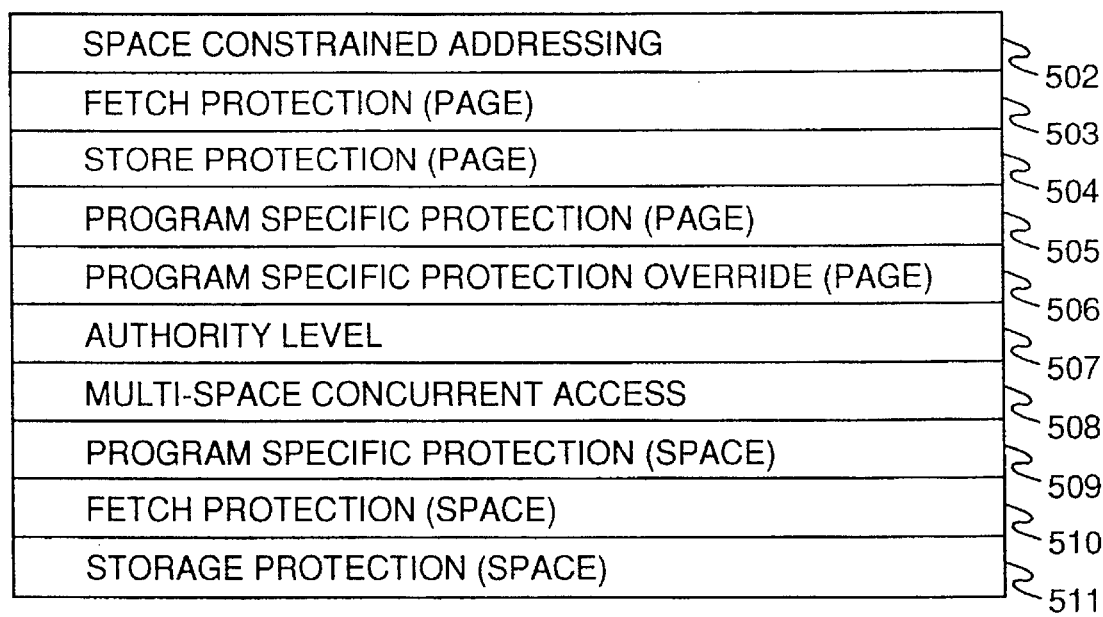
FIG. 5 illustrates examples of different types of contents in the access control (AC) fields in an exploded target virtual effective address.

FIG. 5 shows an example of the plural source access authorization mechanisms in the various conventional architectures whose state values may be represented in fields AC1–ACn in the appended field 100 of exploded VEA 102 for use in a target processor system which does not have some of the source access authorization mechanisms. Each of the entries 502–511 in FIG. 5 may be represented by one of the AC fields in appendage 100, as appropriate for the source machine actually being implemented.

Entry 502 represents space constrained addressing in S/390, which provides addressing constraint to an address space by means of a space identifier descriptor (SID). It is used to restrict storage references within a program to one or more pre-specified address spaces. Typically, these are specified by a control program by use of special registers designating the virtual space definitions to be used by the processor addressing elements in resolving addresses of storage references to be made by an unprivileged program about to be dispatched for execution on the processor. A specific example of such would be the architected control registers in S/390 which specify the Segment Table Designations (STD) for the Primary space, the Secondary space, and the Home space. These can be changed directly only by the privileged control program, and they control accesses by a program operating in virtual addressing mode. A specification of the address space being accessed is one of the AC's of 401. In this example, any one of the AC subfields can contain a code used to represent the current STD token. The AC subfield must have sufficient bits to represent all of the different code representations for the selectable STD tokens.

Other examples of access control mechanisms in FIG. 5 are "page fetch protection" 503 and "page store protection" 504, which restrict fetching or storing within a page being accessed in the designated address space. These page-protection controls are found in each S/390 page table entry, and are further restricted by fetch-access controls provided by the S/390 storage keys found in the current S/390 PSW (program status word). The IBM PowerPC (PPC) architecture has other types of page-table-entry fetch and store access controls. These authorization controls separately authorize fetch and store accesses in a source system architecture, and they may be represented in the AC subfields for differentiating between fetch accesses and store accesses in the addressed page in the target system.

Another example of an access control mechanism is represented by a program-specific-protection field 505 in FIG. 5. This subfield constrains storage accesses by an application program to only those pages which are owned by that program. Such authorization controls are found in the S/390 control registers and PSW storage access key.

AC example 506 represents a control allowing a higher authority program to override program-specific controls, such as having the S/390 PSW storage access key set to value zero, which allows access to real storage page frames protected by any non-zero key value.

AC example 507 may be defined to assign an access priority level value to a program, which value allows a program running with that authority value to have access to data stored under an access constraint key or any other lower access authority value. A specific example of such an access control mechanism is the Multics Ring protection structure in the prior art.

AC example 508 enables a multispace access system to be defined, which constrains an executing program to a specified subset of virtual address spaces defined within the source system. The executing program may specify each virtual address space, by token (such as specified in the S/390 architecture), to which each address is relative. This requires a source control mechanism which specifies a plurality of virtual address spaces to which an executing application program is allowed access, and the target processor restricting the source program's storage accesses to only those spaces. The S/390 Access List (AL) is a specific example of such access control. Each token used in a storage access is interpreted as relative to the AL specified for the particular program currently in execution. Each program may be assigned its own unique AL of available virtual address spaces.

AC example 509 provides an additional layer of storage access authorization over a source program's ability to access an address space defined in its access list. Such an example is the S/390 Extended Authority Index (EAX) associated with an Access List Entry (ALE) in a program's AL. A source program using a token in any of its ALEs may still be restricted by the EAX value from accessing the associated address space, while other source programs may be given the authority to access that address space by executing with a different EAX value.

AC examples 510 and 511 respectively provide fetch and store protection over an entire virtual address space. By contrast, subfields 503 and 504 respectively provide fetch and store protection over only a page of virtual storage. An example is the S/390 ALE fetch-only control, which prevents storing in the entire address space.

The embodiment in this specification utilizes a target processor of relatively simple authorization hardware, in which none of its specific access authorization mechanisms are equal to those required by the source program's architecture. Therefore, all of the source architecture's access authorization controls are provided in the detailed embodiment through use of this invention—by using large virtual addressing capacity with DAT built into the target processor (as supported by the target architecture) to support a complex source machine access control behavior through the use of the target hardware, firmware and/or software controlling the target system's virtual addressing mechanisms.

This specification describes its process in a manner which permits its addressing mechanisms to be implemented in and supported by horizontal microcode, vertical microcode, kernel programming, and/or any other particular implementation means. The invention may be applied on target machines of many different types, as long as they contain the large capacity virtual addressing facilities described herein.

Thus, as each source instruction is executed, the resulting target processor creates a target virtual address (exploded source EA) for each program-requested source storage address (source EA). The target processor performs the appropriate target PTE management for the source storage access authorization controls, and source exception signals are detected by the target processor and triggered by target processor exceptions. As stated above, the target logic can exist in target hardware, microcode, and/or programming. In such an embodiment, the source instructions which make up the source applications, source application enablement environment, and source kernel program are converted automatically by target machine logic to their equivalent target processor representations, executing the entire source environment, unmodified, on the target processor architecture. The target logic which performs the program code conversion is not a subject of this specification.

The invention may alternatively be implemented by placing the target logic for creating exploded virtual addresses in a target machine compiler(s), and the remaining target logic in a target kernel program or microcode. The source application enablement environment and the source applications themselves are recompiled to utilize the exploded EA controls incorporated in the compiler. In this way, the desired set of access authorization mechanisms can be added for the target system.

In the preferred embodiment shown, the authority mechanisms of the S/390 architecture are implemented as a source architecture on a target architecture presumed to not have any of the S/390 authority mechanisms (and therefore is referred to as a "simple" architecture) but having virtual addresses using substantially more bits than the 31 bit addresses in the S/390 architected addresses. For example, the target architecture might use 64 bit addresses like those used in the IBM/Motorola PowerPC microprocessor architecture.

A program written to run on the S/390 architecture requires execution on a processor which is using the rules of the S/390 architecture for executing the S/390 program which may operate, alternatively, in DAT-on and DAT-off modes. Each S/390 page frame (4096 bytes) is protected by a storage key which must be matched by an allowed access authority key in an S/390 PSW if a store is to be performed. Additionally, each S/390 page frame may be protected by preventing fetch accesses to it when the executing program access authority key does not match the storage key protecting the page. Each S/390 page frame also has associated reference and change bit indicators which reflect the operations performed on that page frame during execution of the S/390 program. The S/390 architecture supports multiple virtual address spaces which may be uniquely identified by processes that examine S/390 access registers and S/390 control registers to determine a unique address space identifier (ASID), and by a process hereafter referred to as ART (Access Register Translation), which translates tokens called ALET's provided in the access registers to determine the unique address space identifiers (ASIDs). Depending on the addressing mode specified in S/390 control registers, an access to S/390 storage is directed either to a S/390 control-register-specified address space, or through the ART process to an address space specified by an ALET contained in a S/390 access register associated with a S/390 base register specified in the S/390 instruction which initiates the storage access. The specific address within the address space is typically determined in part by a S/390 base register specified in the source instruction which initiates the storage access. The S/390 structures which govern S/390 DAT and S/390 address space selection are maintained in S/390 control registers, access registers, and real storage. These structures are manipulated by special S/390 instructions in the S/390 kernel program under which the S/390 program must execute. These S/390 characteristics must be maintained during target system execution to reflect the S/390 states during the S/390 program execution.

The target processor in the preferred embodiment supports a single 64-bit virtual address, supporting a total virtual address space of 2**64 bytes, divided into virtual storage units of 4096 byte pages, which are mapped by a target processor DAT mechanism to 4096 byte page frames in target real storage. The DAT mechanism of the target is different from that of the source S/390 processor. In order to more fully illustrate the scope of the invention, the target system described in this embodiment supports no access authority mechanisms, i.e. either pages are mapped by DAT in which case all types of access to the pages are legal, or the pages are not mapped by DAT in which case any type of access results in a target page fault.

Due to the fact that most architectures support some basic access authority mechanisms (e.g. fetch and store protection controls), it is unlikely that all of the access control mechanisms mapped in this embodiment would be done in the manner described for some target architectures.

Figure 6:
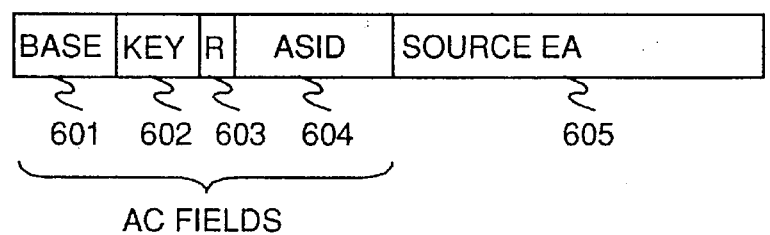
FIG. 6 illustrates the form of a exploded target virtual address in the preferred embodiment.

FIG. 6 shows the form of a target virtual address which is used in the detailed embodiment described herein. The exploded VEA becomes the target virtual address after the source effective address field 605 is concatenated with the AC fields 602, 603 and 604. The source effective address 605 is considered to be "exploded" by the process of extending it with the AC fields and a base field 601. The "exploded virtual address" becomes the "target virtual address" (target VEA) in FIG. 6, when sent to the target processor's DAT mechanism where it is treated as a target processor virtual address. The target VEA is also herein called the "target virtual address" (shown as TVA in the figures) which has the form shown in FIG. 6, containing the source authority control (AC) fields: storage key field 602, Reference (R) field 603 and ASID field 604.

The base field 601 contains an offset value from the zero location of the target virtual storage for locating the beginning of the total source virtual and real address space mapped into the target virtual storage. This target virtual address space is used to represent the totality of the source mechanism addressability in the target system. This source address space is divided into source pages (of 4096 bytes) and mapped into target pages (also 4096 bytes), and these target pages are dynamically stored into target page frames in the preferred embodiment. The source pages use the target page tables to perform this mapping in the manner described herein.

The target processor may need to distinguish between target virtual addresses (TVAs) derived from emulated source programs and source programs written to the native architecture of the target processor. This may be done in several different ways, and the way it is done in the preferred embodiment is by preassigning high-order bits in the base field 601 to indicate that the target virtual address is formatted for an emulated source architecture. Then, any other base value in field 601 will indicate that the target virtual address is formatted for the processor's native architecture; in the native architecture, there are no AC fields and all of the bits of the target virtual address are considered regular virtual address bits in the manner of prior processors using virtual addressing. In some cases, the native architecture may reserve some of the bits in each target virtual address as predefined flag bits to indicate predetermined states used in native virtual addressing.

The source storage key in field 602 is a four bit field in the preferred embodiment for providing 16 key values from key 0 through key 15. The key in field 602 is compared with a program key provided by the system kernel program in a source program status word (or its equivalent in the source architecture). Predetermined comparison states allow the access by the TVA (when acting as an exploded source virtual address), and its other comparison states prevent the access. An example of such source comparison states are defined for the storage key comparison in the prior IBM S/390 architecture—defined in the currently published IBM ESA/390 Principles of Operation (form number SA22-7201-01).

The reference R field 603 is a one bit field which has either a fetch or store setting for indicating whether the access by this TVA is a fetch or a store operation in the source storage.

The source ASID (address space identifier) field 604 is a 16 bit field for identifying any of up to 64K of source address spaces.

The source EA field 605 is a 32 bit field in the TEA for containing the source effective address—in the preferred embodiment it contains 31 address bits and a high-order zero bit as defined in the IBM S/390 architecture.

Figure 2:
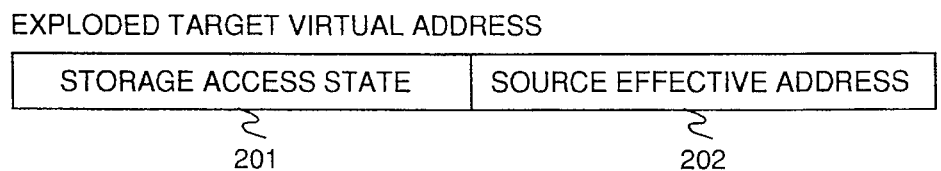
FIG. 2 illustrates the form of an exploded target virtual effective address.

The effect of combining all of these AC fields in the target virtual address (by the process called virtual storage explosion), is to cause the same source effective address (605) to resolve to a different target virtual effective address for each permutation of the source access control states in field 201 in FIG. 2. The permutations allow a large number of TEAs for one source effective address. The TEAs related to the same source effective address are called synonyms herein.

Figure 7:
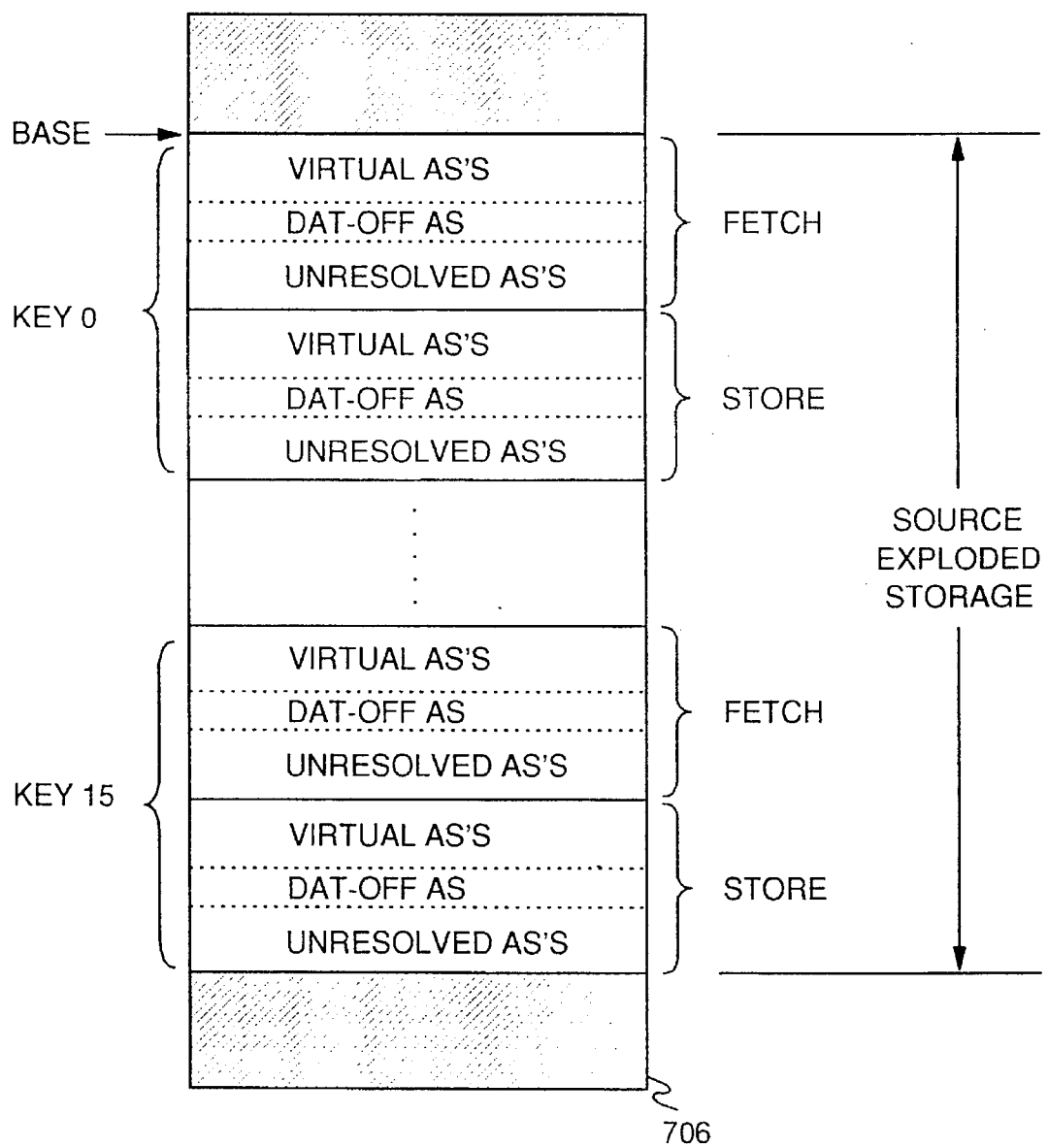
FIG. 7 illustrates an organization of target virtual storage, in which address spaces are arranged as permutations of the access control fields of storage key assignment, reference used, and ASID assignment.

In this manner, the source address spaces shown in FIG. 7 are organized within source key areas in the target virtual storage. Further, each of these key areas is divided into a fetch area and a store area. The result of this key/R area type of organization is to provide 32 key/R areas for including data of each source address space, which range from a "key 0 fetch" area through a "key 15 store" area. Each of the 64K allowable address spaces has an assigned range within each key area for fetch and for store. Each key area also has unique address ranges assigned for source DAT-OFF references to source real storage and unresolved ASID encodings described herein.

The same source address space (having the same ASID value) is provided in each of these 32 key/R areas, providing each address space with the ability to have 32 different access authorization controls on the data in each address space. That is, a different target virtually addressed area is provided for each source address space, for which each virtually addressed area is distinguished by a different authorization control permutation by storage key value and fetch/store reference type, allowing each authorization control setting to be uniquely expressed in target machine addressing.

The range of all possible ASID values usable by the current source program is represented in FIG. 9. The address spaces (AS) for this range of ASIDs are replicated in each of these 32 key/R areas. That is, the same ASID value to access the same address space in each of the 32 key/R areas, with only the type of access control differing among the 32 different key/R areas using the same ASID value in the TEA. Hence, this manner of exploded address AS mapping in FIG.

7 enables control of a set of address spaces according to the particular settings in the base, key, R and ASID fields 601, 602, 603 and 604 in FIG. 6.

Thus, any access by the source machine program is permitted in the target storage only if the source access generates a TVA which has licit values in all of the TEA's AC fields of: key, R and ASID. For example, a source program access of a fetch at a VEA for data having source storage key occurs in the target address area identified in the TEA to have all of the specified: key, R and ASID. For example, if a source access specifies a reference to an ASID in the "key 15 fetch" area, the target access will be made in that part of exploded storage. A target page fault causes the access authority state to be validated. The access is allowed under source rules, a PTE is established for the TEA and reference to it subsequently occurs at full target hardware speed. If the access is illegal, it is reported under source architectural rules.

Figure 26:
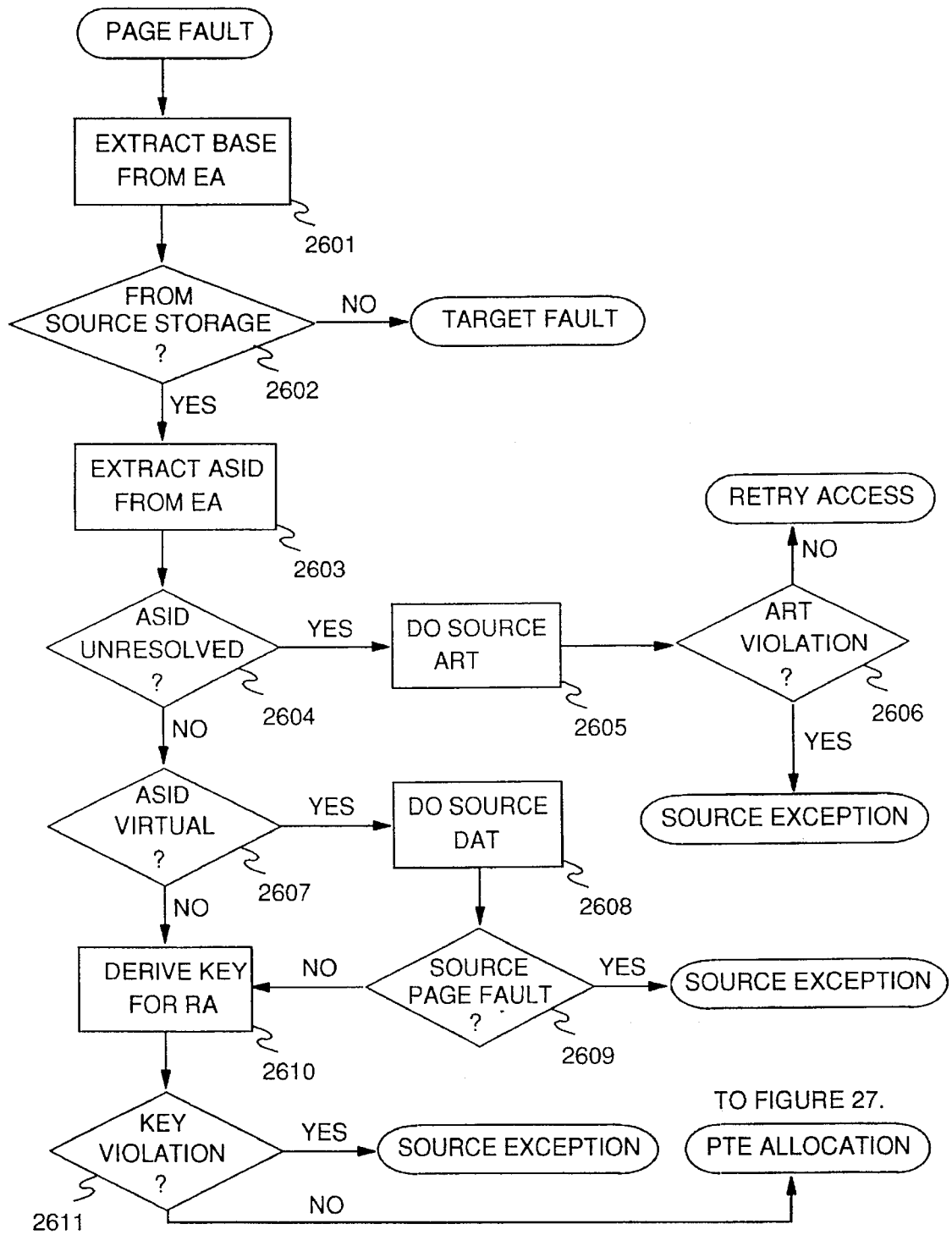
FIG. 26 illustrates a process for interpreting the authorization codes in the AC fields of a target virtual effective address (VEA) having the form shown in FIG. 6.

The process for interpreting the AC field values in each TEA during the DAT operation is disclosed in FIG. 26. By this technique, the simple DAT mechanism in the target machine is able to differentiate between each of the source storage access state characteristics deemed necessary in the operation of a particular embodiment. The use of a validity indication for each page table entry and TLB entry containing a previously-translated TEA (for any of multiple source EAs representing different permutations of the storage access authority states) upon each access initiation enables accesses made by this invention to proceed with the efficiency provided for access using the native target architecture of the processor. The validity indication for a TLBE and/or PTE accessed for each source program EA access is checked by the DAT mechanism in the target processor. Then, only those source accesses in which the DAT check does not find a valid PTE or TLBE are trapped to recognize an unchecked access authorization state, which is then subjected to an exception signal interpretation mechanism in the target processor. Exception signal interpretation mechanisms in processors are well known in the prior art.

In this manner, the target address space mapping in FIG. 7 supports the TEAs in FIG. 6 representing exploded source addresses for containing source AC authorization constraints in a target environment. This enables use of source access authorization constraints in target address accesses in a processor not having originally built-in the source access authorization controls. The methods supporting the processes needed for interpreting the source authorization controls in a target processor may be provided in the kernel program which controls operations in the processor.

The mappings shown here are not essential to the invention, since the illustrated set of mappings is associated only with a particular embodiment dependent on differences between the source and target architectures for that embodiment, as well as a number of design and performance trade-offs specific for this embodiment.

Each of the source key subareas in the target address space shown in FIG. 7 is broken into three classes of address space according to the ASIDs of the address spaces: virtual AS are determined by having the ASID derived from control registers or access registers. The DAT-off AS is specified by a unique address space ASID, since it must also be mapped in the target virtual space. The unresolved ASID's specify a source register which is designed to contain an ASID, for which the value of the ASID is unknown (unresolved). When source ART is performed, an unresolved ASID is changed to the specific ASID assigned for the source AS. That ASID becomes part of any exploded target address used to access source storage of that address space.

FIG. 9 shows the range of possible ASID values: virtual ASID's, which represent the totality of possible unique source address spaces, the DAT-off ASID, which specifies a region of target virtual storage which is associated with source DAT-off storage accesses, and the set of unresolved ASID's described above, one for each of the 19 AAT entries required to efficiently implement the source architecture in this embodiment. The source architecture determines the ASID for each storage access based on information contained in the source control registers, source access registers, and source real storage. The various source addressing modes and source operations in this embodiment use 19 different address spaces through implicit means at any given time. These are the primary, secondary, home, and AR address spaces, which are specified by information maintained in source control registers, and in any of 16 source access registers. That is, an access in an AS cannot be made until the ASID for that address space is resolved by making the ASID available in the TEA.

In order to avoid ASID translation on each storage access, up to 19 ASID translations can be stored at any given time in an AAT (active ASID table 801) shown in FIG. 8. There is one AAT entry for each source register that can specify the address space of a reference. In a S/390 embodiment there are 19 such registers, as indicated in FIG. 8. The ASID in the AAT corresponding to the space specifying control register, as deferred by source architecture, becomes part of the target exploded address used for the access. In order to make the resolution of unresolved ASIDs as efficient as possible when they cause target page faults as part of a TEA, a unique ASID code is assigned for an unresolved value in each of the 19 control registers, e.g., an unresolved Primary Space ASID is different from an unresolved Secondary Space ASID, which is different from an unresolved AR ASID, etc. Nineteen values are assigned such that, on a TEA page fault, it is known unambiguously which source control register requires a specific resolved ASID. FIG. 9 indicates the assignment of ASID values, including those for DAT-off accesses and for unresolved ASID's in specific control registers.

Subsequent storage accesses associated with the same AAT entry are made without changing the AAT entry. A reserved ASID value (called an unresolved ASID) may be placed in the AAT entry, but this AAT entry cannot be used successfully for an access until its ASID is resolved. There is a unique unresolved ASID value for each entry position in the AAT, based on which control register is associated with the unresolved ASID value. A storage access may incorporate an unresolved ASID value into its TEA causing a target page fault. At that time, the prescribed methods of the source architecture are employed by the target processor to resolve the correct ASID at a required place in the AAT entry.

In this embodiment, target instructions utilize a 64-bit target base register when calculating target effective virtual addresses. It is in one of these target base registers that the components of the source storage access state are combined with a source effective address, producing a target virtual address. The target base register, called an exploded virtual address register (EVAR) when used in this manner, is then used by target storage access instructions to perform source storage accesses. While it is possible to use only one EVAR, there are economies gained when multiple EVAR's are employed to preserve as much state information as possible. In this embodiment, there would ideally be enough EVAR's to preserve all of the information in the AAT, making it unnecessary to move ASID's from the AAT to an EVAR. However, it is more realistic to assume that a target architecture will not have an unlimited supply of base registers. For this embodiment, three target base registers are set aside to function as EVAR's. FIG. 10 shows the three EVAR's: the instruction fetch EVAR 1001, which is used for all source instruction fetches, the data fetch EVAR 1002, which is used for all source data fetches, and the data store EVAR 1003 which is used for all source data stores.

In each of the three EVAR's, the base field, which sets the origin of the source mapping into target virtual, never changes. Also, the reference fields in EVARs 1001 and 1002 are permanently set to F (fetch), and in EVAR 1003 to S (store). In this embodiment, the source architecture specifies that the instruction ASID can be assumed to be stable, until a source operation explicitly changes it. The same is true for the data ASID in certain source addressing modes (i.e. primary, secondary, home). In these cases it is unnecessary to update the ASID field in an EVAR with each access. Such cases are called "simple" accesses and are described in detail in flowcharts. The only field in an EVAR that need be updated for each storage access is the source EA field. The cases in which it is necessary to move the correct ASID from an AAT entry to an EVAR before each access are called "complex" accesses and are described in detail in the flowcharts. Processes used in the operation of this embodiment are shown in flowcharts shown in FIGS. 14 through 27.

In the processor of the target machine, after an effective address has been generated for a target storage access, the hardware checks its Page Table for an associated Page Table Entry (PTE) resolving the given target VEA to a real storage PF address. In actual operation, a virtual address that has been used relatively recently has its translation to a real address in an PTE and in a TLB. When a virtual address is encountered by the processor in the execution of one of its instructions, and its translation is not found in a valid PTE, an interruption occurs in the processor control flow, in which the processor transfers control to a pre-established address in the kernel program. The kernel program is responsible for establishing PTE's for processor referral, supplying the virtual-to-real address translation in a valid PTE, possibly by redefining a currently valid PTE from one address to another, and causing the processor to re-execute the instruction whose operand address caused the page fault. The PTE's are an essential, defined part of the interface between the target kernel program and the target processor.

Figure 11:
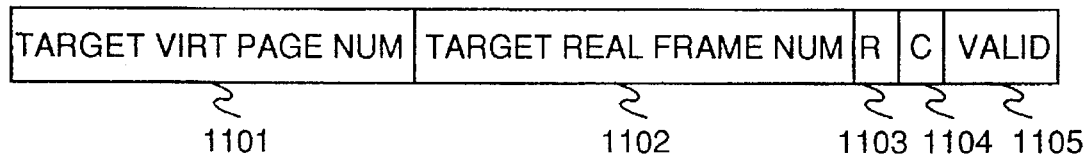
FIG. 11 is an example of a PTE (page table entry).
Figure 12:
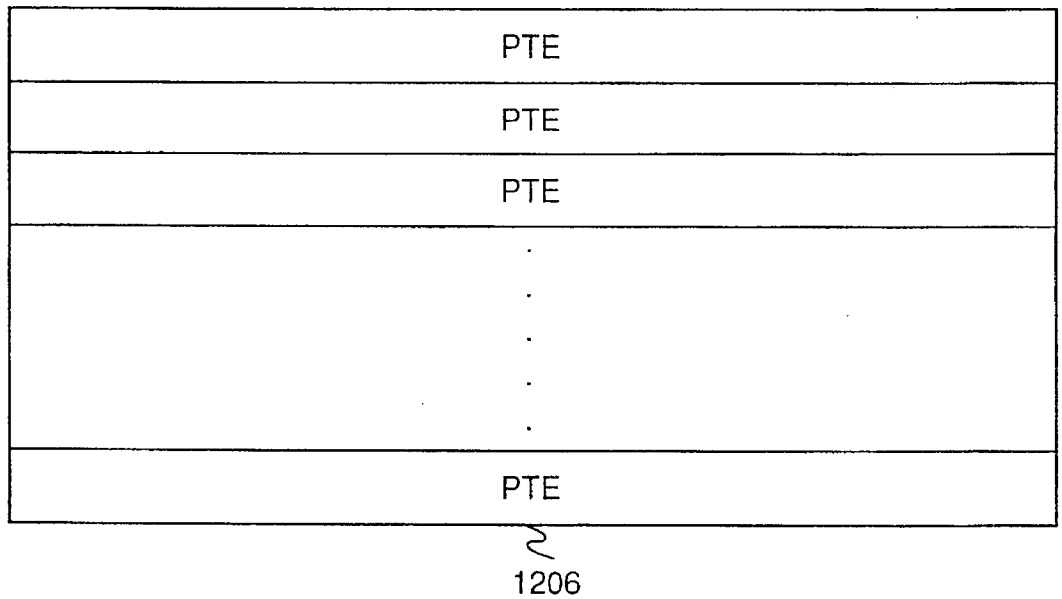
FIG. 12 represents a target page table (PT).

FIG. 11 illustrates the format of the page table entries (PTE's) in the target system defined for this embodiment. The PTE includes a target virtual page number (1101) representing the PTE, a target real frame number (1102) backing the associated virtual page, an indication (1103) of whether or not the page has been referenced since the PTE was established, an indication (1104) of whether or not the page has been changed since the PTE was established, and an indication (1105) of whether or not the PTE is valid. As shown, there is a group of assignable PTE's in a target processor's page table FIG. 12. The PTEs are assigned dynamically, as described in the flowcharts, during program execution, to direct the target system to the proper real page for each virtual storage reference. A target processor searches the defined PTE's for virtual addresses encountered during program execution. The PTE's are a defined part of the target system architecture, i.e. the defined operational interface of the target processors, as is the method for searching for a particular virtual address in the set of defined PTE's. Such methods are in the prior art.

Since this invention extends a source EA by a field representing the system access states at the time of the reference, each source EA may be transformed into multiple target VEAs (i.e. multiple exploded VEAs). Multiple exploded VEAs result when the same source EA is used in plural accesses having different states. Such multiple target exploded VEAs resolve to the same target real page frame, which represents a single source page frame. Consequently, one or plural target PTEs may resolve plural exploded (target) VEAs to the same target real page frame (PF). Thus, plural target PTEs may address the same target PF. The target VEAs addressing the same PF are "synonym target VEAs".

Each time the same source EA/ASID combination is accessed in a source program, the same source EA/ASID combination will access the same source PF in the target real storage regardless of the different authority states which may be recorded in the particular target (exploded) VEA, if the authority states stored in that target (exploded) VEA satisfy the source machine access states required for the access.

Then, if the operation of a source program requires invalidation of a source page (virtually addressed by a source EA), then invalidation must be done to all synonym target PTEs (addressing the SAME target PF, regardless of different access authority states being contained in their associated target (exploded) VEAs. Since there may be any number of synonym PTEs, the target system must keep a record of the synonym PTE's (which resolve to the same real page frame). This is done by maintaining a Source-Frame-to-PTE-List Directory (1307) referencing entries in a Single-Frame-to-PTE-List area (1308). This is illustrated in FIG. 13.

Figure 13:
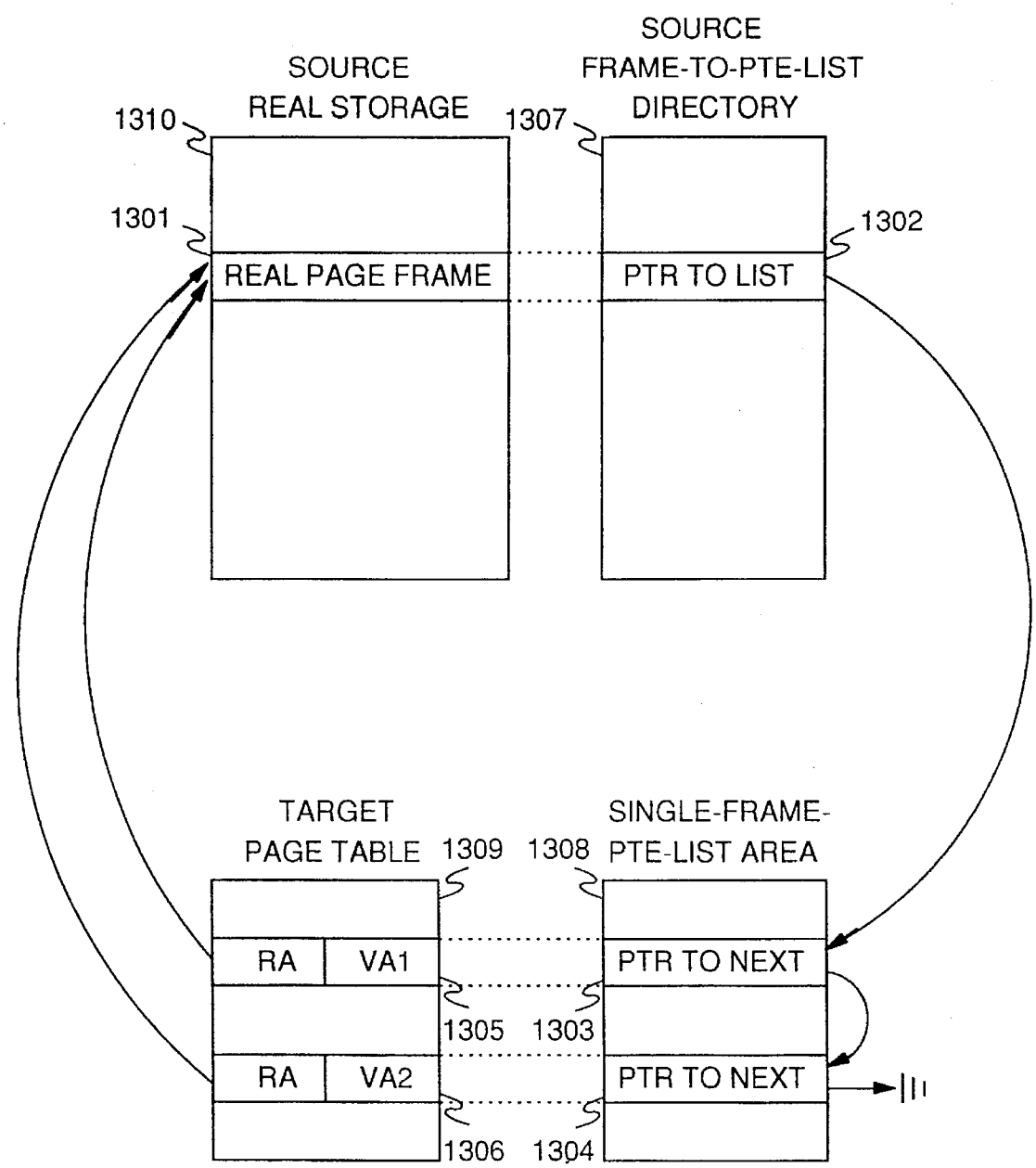
FIG. 13 represents a mapping of target page table entries to real storage page frames.

In FIG. 13, a synonym relationship is maintained among each synonym set of PTEs by pointer addresses put into the PTE-associated area pointers (1303, 1304), which chain together their associated PTEs in each synonym set. Each PF 1301 in real storage 1310 is associated (e.g. by having equal indices) with one directory pointer (1302) in list directory (1307). And, each PTE (1305 or 1306) in target page table (1309) is associated with one chain pointer (1303 or 1304) in list area (1308). Thus, each chain pointer (1303, 1304) provides an address to a next chain pointer in its synonym set. The last chain pointer in each synonym set is indicated by containing a predetermined value, such as all-zeros. When all PTE's in a synonym set are to be invalidated, the corresponding source frame directory pointer (1302) locates all PTEs in its synonym set by addressing the first chain pointer for the associated set of synonym PTEs.

So, if a real frame is to be reassigned in the source real storage, all synonym PTE's (resolving to that source real frame in a target (exploded VEA) can be found and invalidated. Thus, a future reference to this target VEA by a program will cause a target system page fault.

The flowcharts in FIGS. 14 to 26 describe processes through which the target system utilizes the described invention to implement the access authority mechanisms of a source processor (these mechanisms are implicit in source storage accesses), as well as processes for implementing other requirements of the source architecture that are affected by the constructs associated with the invention (e.g., mechanisms used by the source architecture to manipulate the authority structure).

In the embodiment shown here, the source architecture dictates that some storage accesses are associated with an address space specified by control register information, while others are associated with an address space specified by a token contained in an access register associated with a base register used in base register addressing. In this embodiment, a storage access whose address space can be predetermined to be specified by control register information is referred to as a "simple" storage access, and it can be assumed that the ASID of the address space associated with the storage access will be maintained in the EVAR that is associated with the type of access (i.e. instruction fetch, data fetch, data store), and does not have to be re-inserted on every access. A storage access whose address space can be predetermined to be specified by access register information or whose address space specification can not be predetermined is referred to as a "complex" storage access, and it can be assumed that the ASID of the address space must be inserted into the EVAR that is associated with the type of access (i.e. data fetch, data store) on every access. Since the assumptions associated with "simple" storage accesses are violated by the occurrence of "complex" storage accesses, the types can not be intermixed, i.e., the target machine must execute source programs in one of two modes: "simple" data access mode in the case where it has been determined that all data accesses will be specified by source control register information, and "complex" data access mode in the case where such a determination cannot be made. As described below, all instruction fetches are handled by "simple" storage access.

Figure 14:
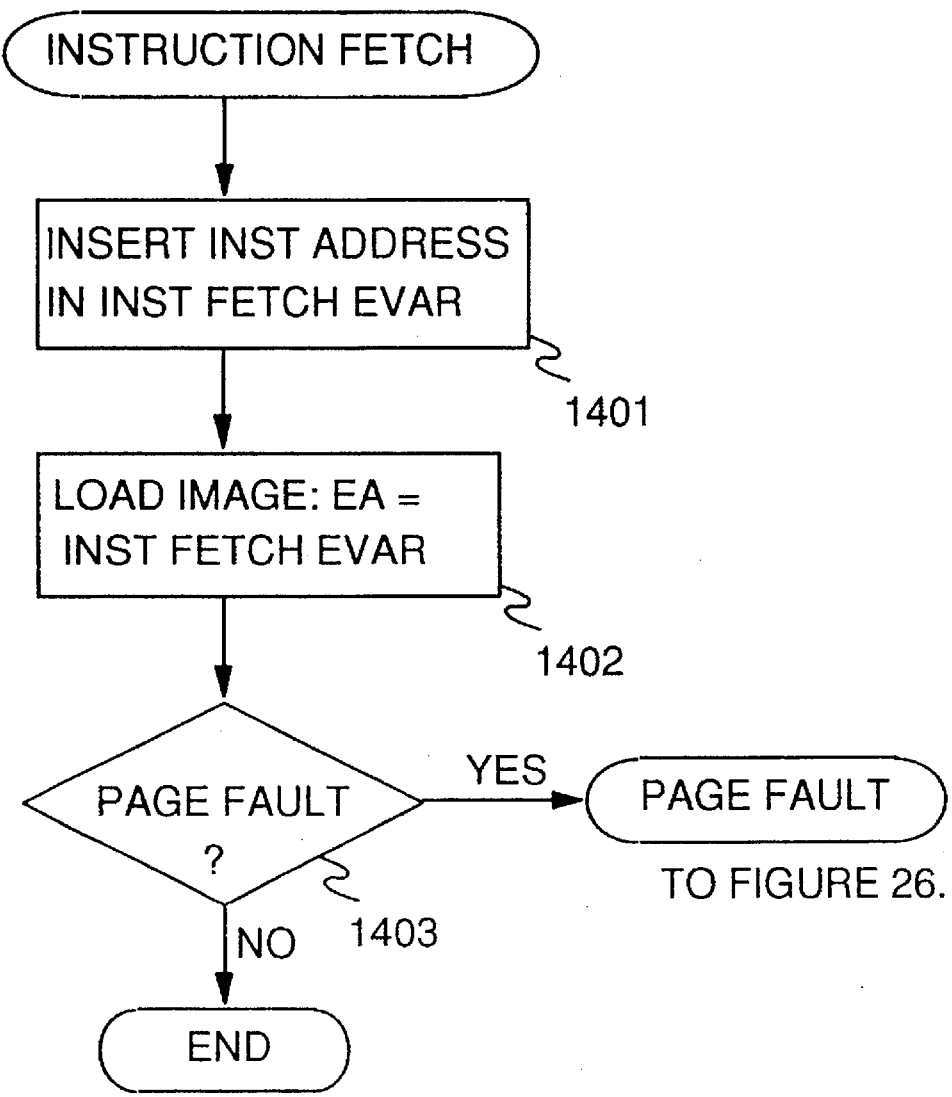
FIG. 14 is a flow diagram of a simple instruction fetch storage access process.

FIG. 14 shows the target processor logic for a source instruction fetch. In the embodiment shown here, the source architecture dictates that instructions be fetched from an address space specified by control register information, so all instruction fetches are "simple" storage accesses. Therefore, the ASID associated with the instruction fetch can be assumed to be in the instruction fetch EVAR (1001). Step 1401 inserts the source effective address (301) of the instruction location into the instruction fetch EVAR (1001). Step 1402 uses the contents of the EVAR (1001) to access the location in target virtual storage (address 302 or address 303) containing the instruction image. Step 1403 determines whether or not a target page fault has occurred. In the example shown in FIG. 3, an access by target virtual address (302) does not result in a target page fault, as PTE (304) contains a valid mapping. In this case, the instruction image from target real storage location (306) representing the source real storage location is loaded and processed as the next source instruction. An access by target virtual address (303) does result in a target page fault, as PTE (305) contains no valid mapping. In this case, control passes to step (2601), to resolve the page fault.

Figure 15:
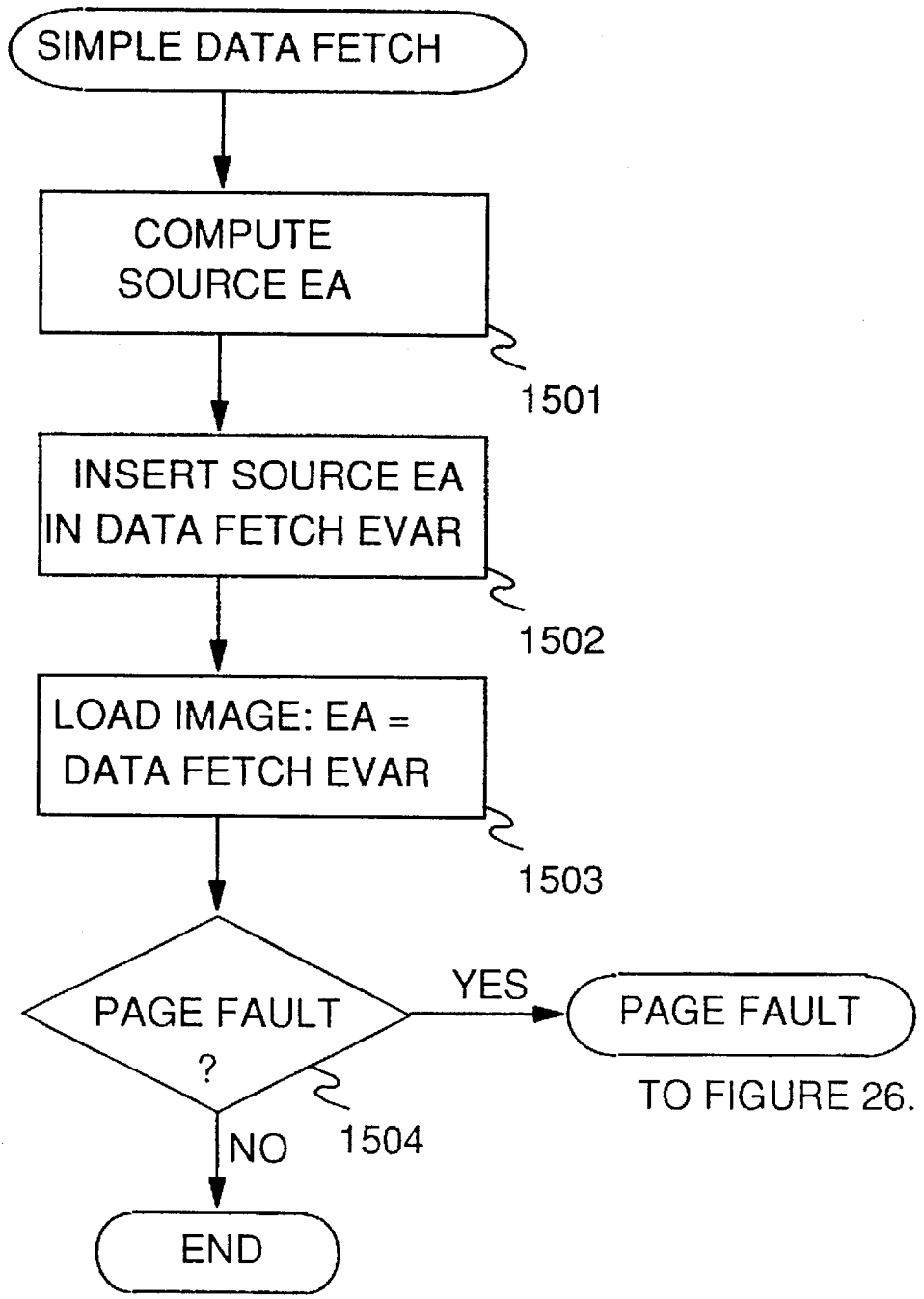
FIG. 15 is a flow diagram of a simple data fetch storage access process.

FIG. 15 shows the target processor logic for a "simple" source data fetch, for which the ASID of the associated address space can be assumed to be in the data fetch EVAR (1002). Step 1501 computes the source effective address (301) of the data location, according to the rules specified in the source architecture. Step 1502 inserts the source effective address (301) of the data location into the data fetch EVAR (1002). Step 1503 uses the contents of the EVAR (1002) to access the location in target virtual storage (address 302 or address 303) containing the data image. Step 1504 determines whether or not a target page fault has occurred. An access to target virtual storage location address (302) does not result in a target page fault, as PTE (304) contains a valid mapping. In this case, the data image from target real storage location (306) representing the source real storage location is loaded. An access to target virtual storage location address (303) does result in a target page fault, as PTE (305) contains no valid mapping. In this case, control passes to step (2601), to resolve the page fault.

Figure 16:
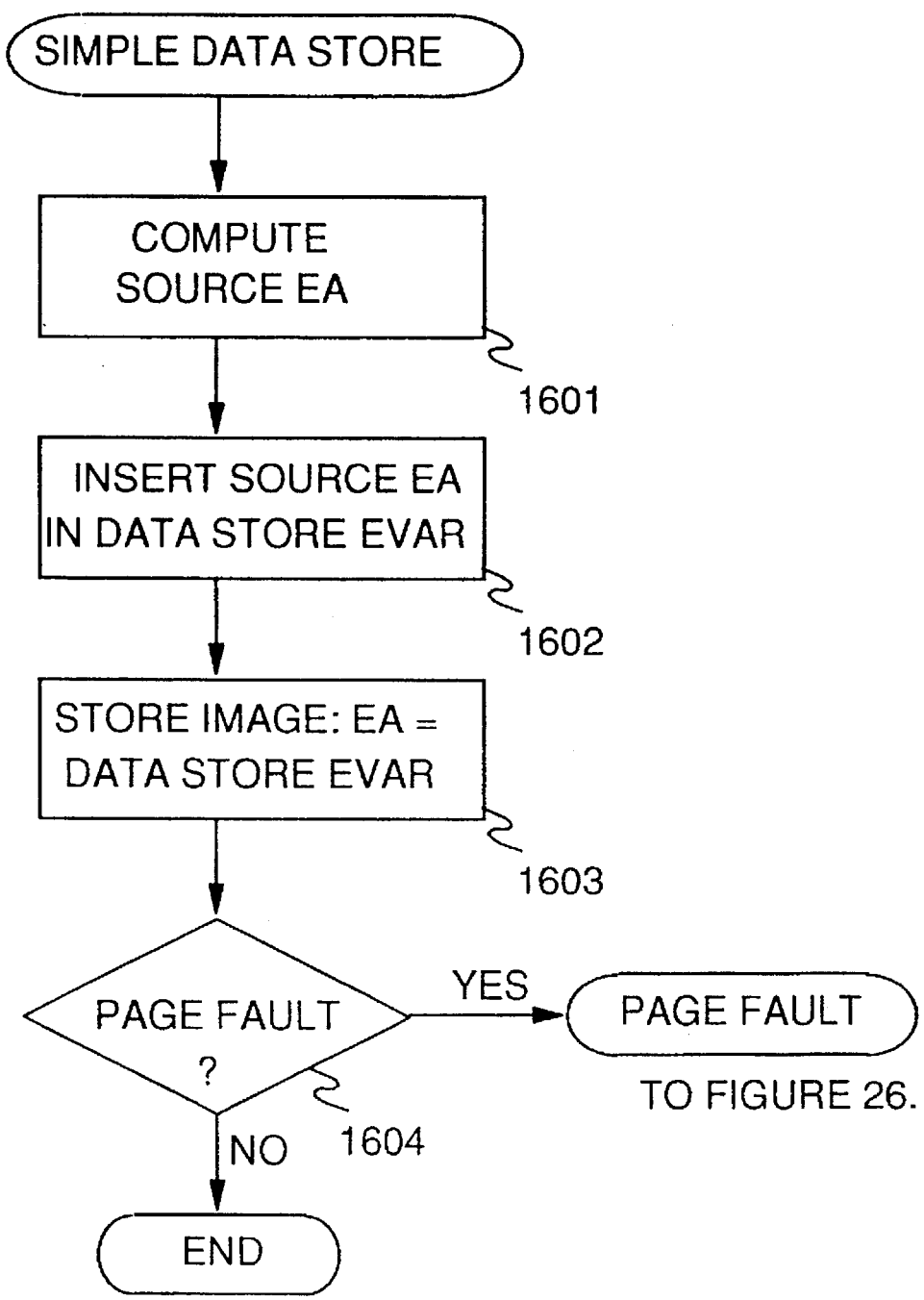
FIG. 16 is a flow diagram of a simple data store storage access process.

FIG. 16 shows the target processor logic for a "simple" source data store, for which the ASID of the associated address space can be assumed to be in the data store EVAR (1003). Step 1601 computes the source effective address (301) of the data location address, according to the rules specified in the source architecture. Step 1602 inserts the source effective address (301) of the data location into the data store EVAR (1003). Step 1603 uses the contents of the EVAR (1003) to access the location in target virtual storage (address 302) that is to contain the data image. Step 1604 determines whether or not a target page fault has occurred. An access to target virtual storage location address (302) does not result in a target page fault, as PTE (304) contains a valid mapping. In this case, the data image is stored to target real storage location (306) representing the source real storage location. An access to target virtual storage location address (303) does result in a target page fault, as PTE (305) contains no valid mapping. In this case, control passes to step (2601), to resolve the page fault.

Figure 17:
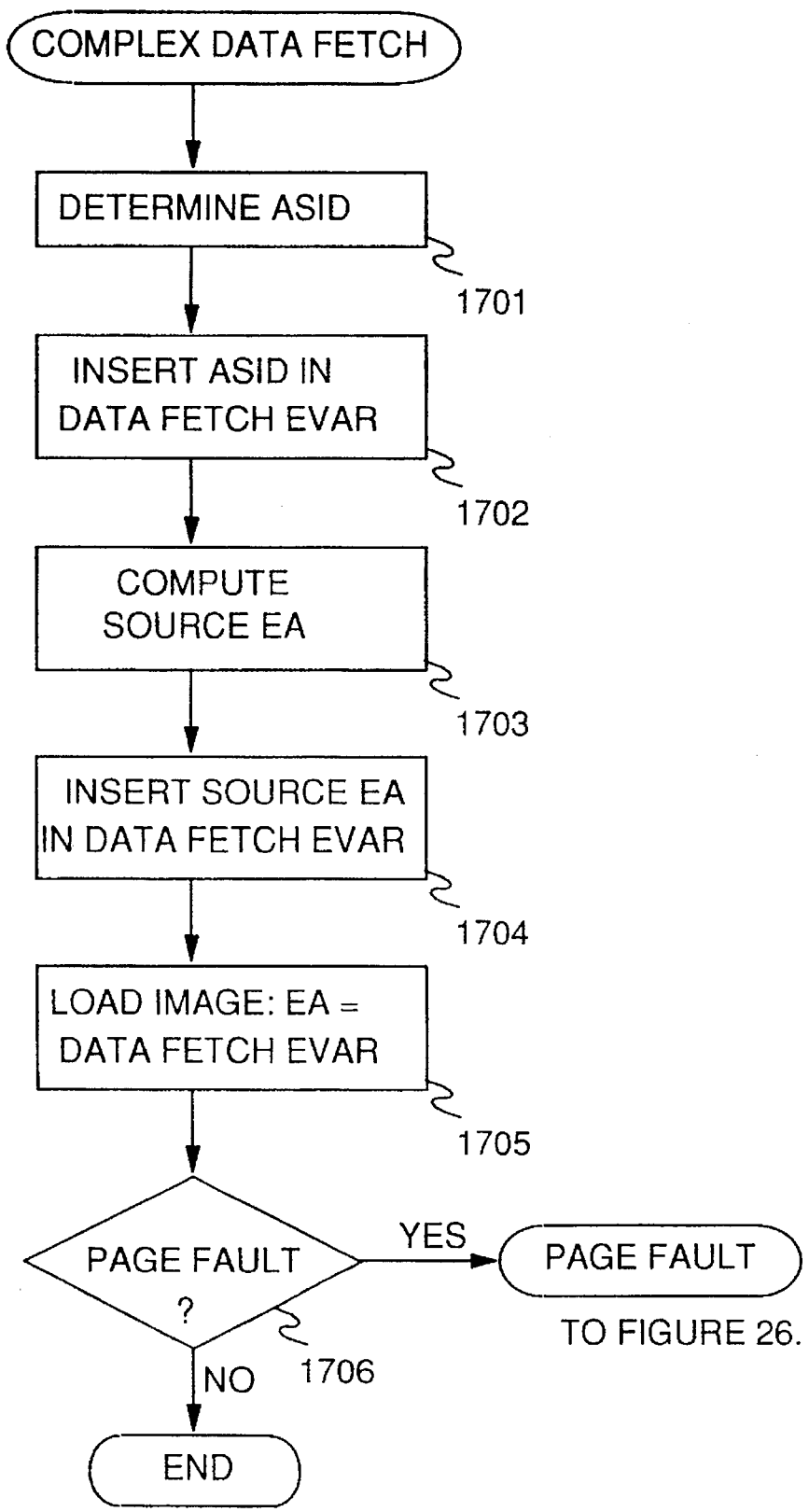
FIG. 17 is a flow diagram of a complex data fetch storage access process.

FIG. 17 shows the target processor logic for a "complex" source data fetch, for which the ASID of the associated address space must be copied from the AAT entry (801) associated with the appropriate access register into the data fetch EVAR (1002). Step 1701 uses the base register field in the instruction image to determine which access register specifies the AAT entry (801) which holds the ASID. Step 1702 copies the ASID from the AAT entry (801) to the ASID field in the data fetch EVAR (1002). Step 1703 computes the source effective address (301) of the data location, according to the rules specified in the source architecture. Step 1704 inserts the source effective address (301) of the data location into the data fetch EVAR (1002). Step 1705 uses the contents of the EVAR (1002) to access the location in target virtual storage (address 302) containing the data image. Step 1706 determines whether or not a target page fault has occurred. An access to target virtual storage location address (302) does not result in a target page fault, as PTE (304) contains a valid mapping. In this case, the data image from target real storage location (306) representing the source real storage location is loaded. An access to target virtual storage location address (303) does result in a target page fault, as PTE (305) contains no valid mapping. In this case, control passes to step (2601), to resolve the page fault.

Figure 18:
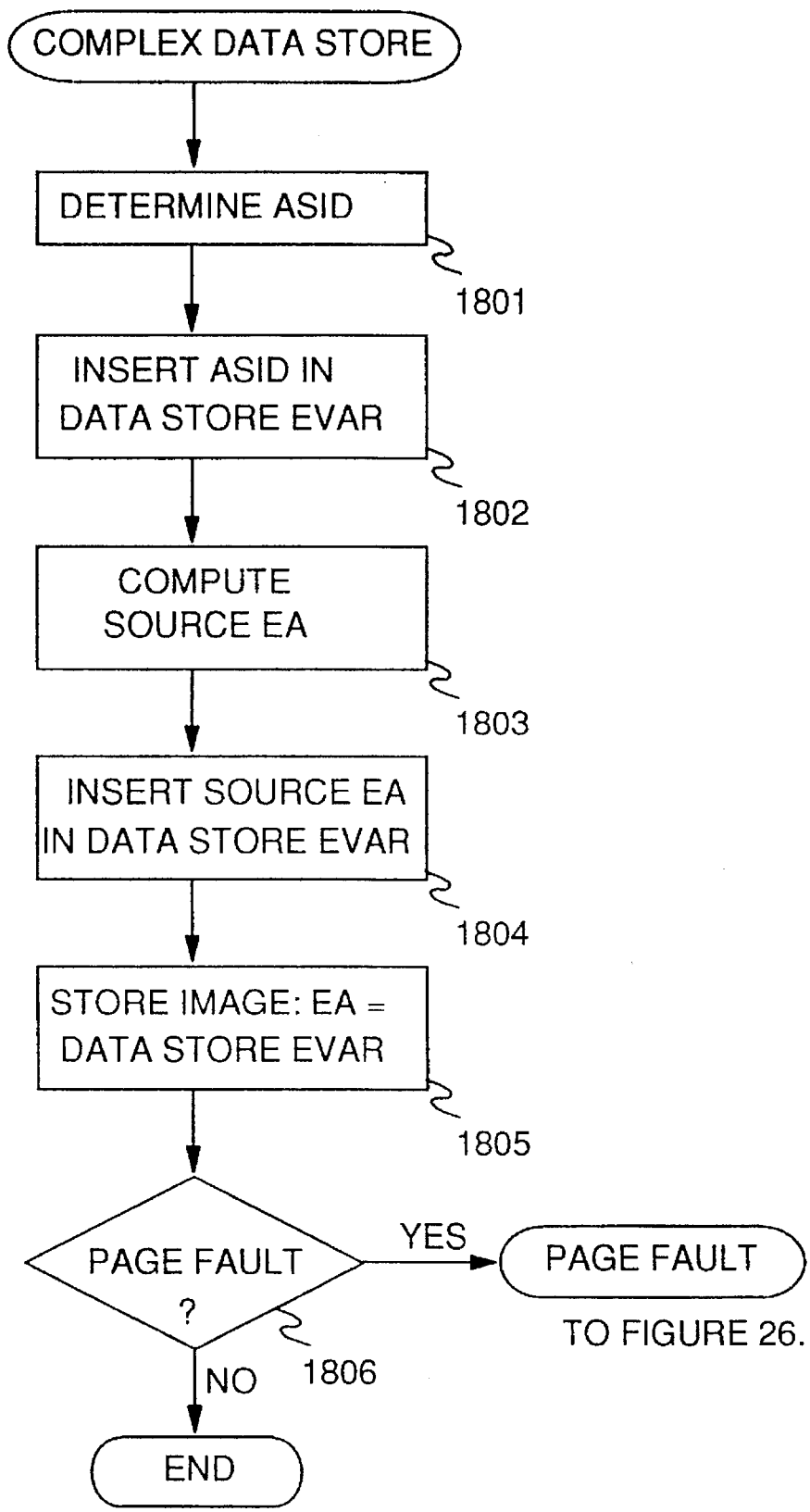
FIG. 18 is a flow diagram of a complex data store storage access process.

FIG. 18 shows the target processor logic for a "complex" source data store, for which the ASID of the associated address space must be copied from the AAT entry (801) associated with the appropriate access register into the data store EVAR (1003). Step 1801 uses the base register field in the instruction image to determine which access register specifies the AAT entry (801) which holds the ASID. Step 1802 copies the ASID from the AAT entry (801) to the ASID field in the data store EVAR (1003). Step 1803 computes the source effective address (301) of the data location, according to the rules specified in the source architecture. Step 1804 inserts the source effective address (301) of the data location into the data store EVAR (1003). Step 1805 uses the contents of the EVAR (1003) to access the location in target virtual storage (address 302) that is to contain the data image. Step 1806 determines whether or not a target page fault has occurred. An access to target virtual storage location address (302) does not result in a target page fault, as PTE (304) contains a valid mapping. In this case, the data image is stored to target real storage location 306 representing the source real storage location. An access to target virtual storage location address (303) does result in a target page fault, as PTE (305) contains no valid mapping. In this case, control passes to step 2601 (in FIG. 26) to resolve the page fault.

Figure 19:
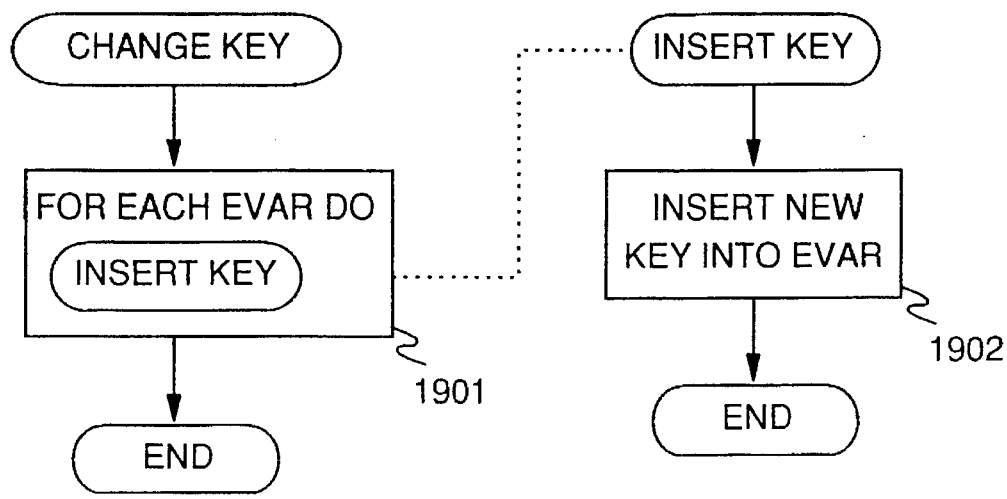
FIG. 19 is a diagram of storage key manipulation.

FIG. 19 shows the target processor logic executed when the source program changes the storage access key to be used for subsequent source machine program storage accesses. Step 1901 causes step 1902 to be executed for each EVAR: the instruction fetch EVAR (1001), the data fetch EVAR (1002), and the data store EVAR (1003). Step 1902 inserts the new key value into the EVAR specified in step 1901.

Figure 20:
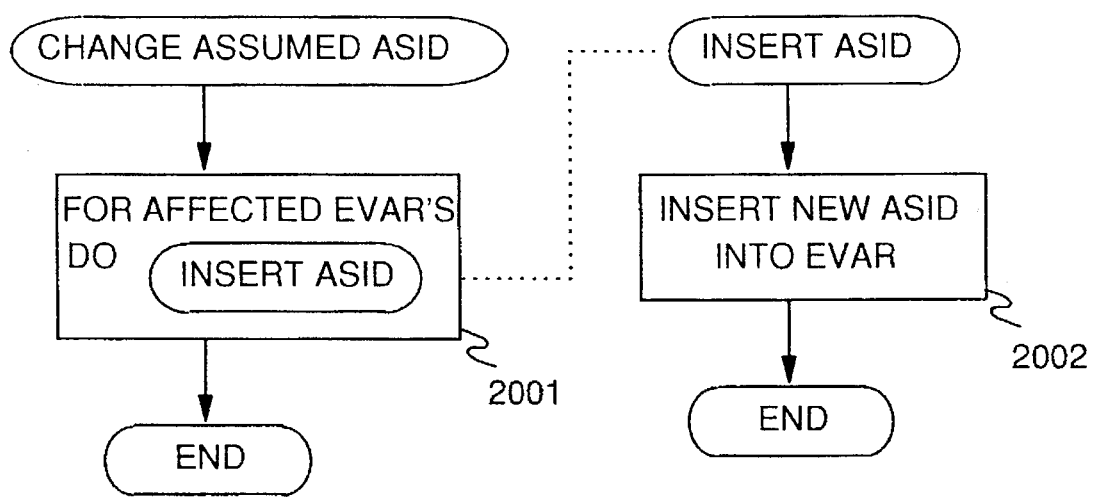
FIG. 20 is a diagram of ASID insertion in an EVAR.

FIG. 20 shows the target processor logic executed when the source control register set changes such that the "assumed" ASID maintained in the EVAR's (1001, 1002, 1003) for "simple" storage accesses must change according to some rules specified in the source architecture. For example, if the address space of program execution changes due to a task switch, the instruction fetch EVAR, and possibly the data fetch EVAR and data store EVAR, must be modified to reflect the change in the "assumed" ASID. Step 2001 causes step 2002 to be executed for any EVAR's that must be changed from the following set: the instruction fetch EVAR (1001), the data fetch EVAR (1002), and the data store EVAR (1003). Step 2002 inserts the new "assumed" ASID which is computed according to rules specified in the source architecture into the EVAR specified in step 2001.

Figure 21:
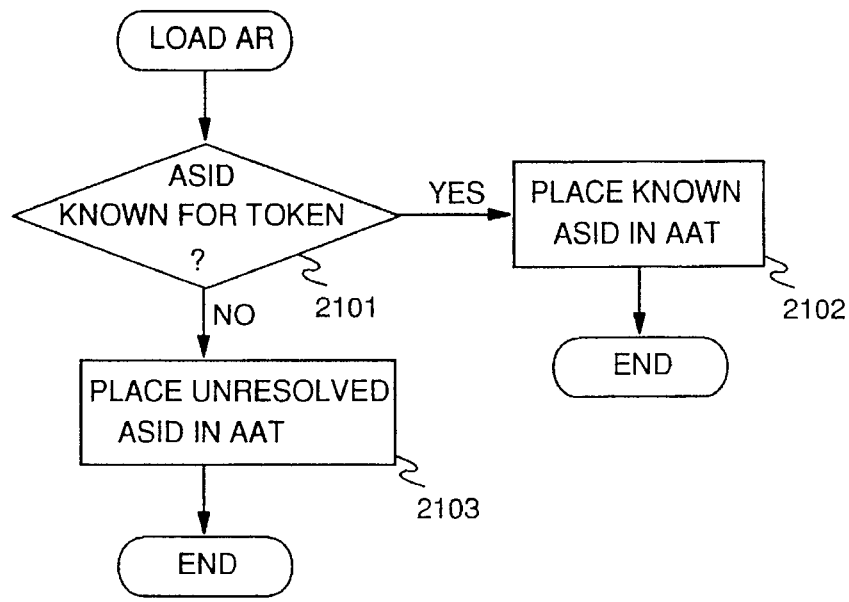
FIG. 21 is a diagram of ASID loading in an AAT.

FIG. 21 shows the target processor logic executed when the source places a new token in an access register associated with a base register. The AAT entry (801) associated with the access register must be loaded with a new ASID to reflect the change to the token in the access register. In step 2101 the target checks whether the ASID for the new token in the access register is known. If it is, step 2102 stores the known ASID value (a virtual ASID from 902) in the AAT entry (901) associated with the access register. If it is not known, step 2103 stores the unresolved ASID for that access register (902) into the AAT entry (801) associated with the access register. The purpose of an unresolved ASID is to force a page fault the next time a storage access uses the ASID, so that the source architecture rules may be applied at that time to determine the actual value of the ASID. The value of the unresolved ASID indicates the precise AAT entry (801) into which the newly determined ASID value should be placed. This is discussed for FIG. 26.

Figure 22:
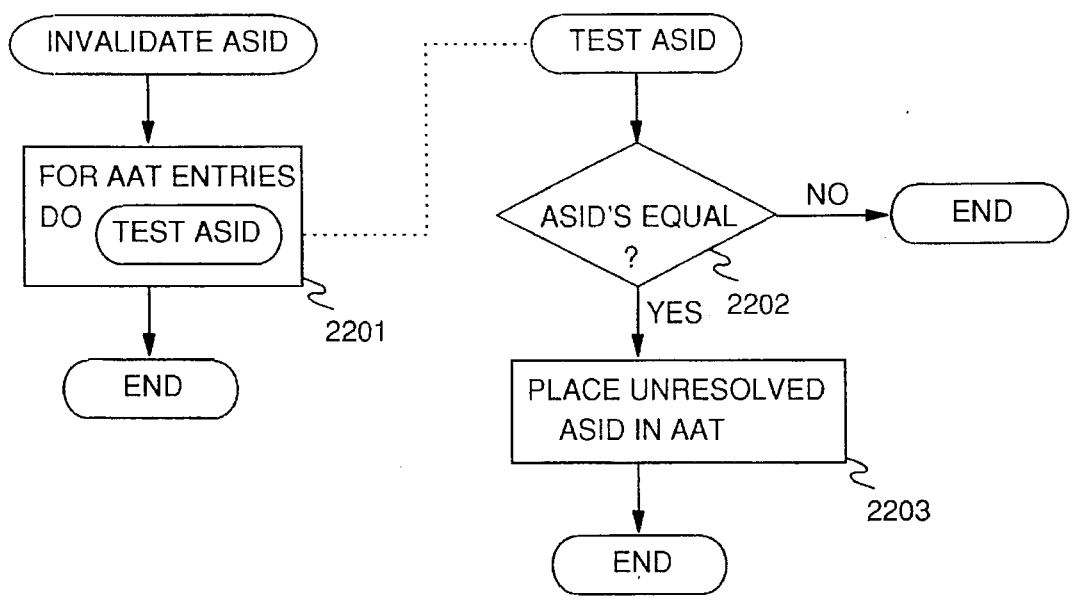
FIG. 22 is a diagram of ASID invalidation in an AAT.

FIG. 22 shows the target processor logic executed when a source operation results in the invalidation of an ASID. Step 2201 causes step 2202 and possibly 2203 to be executed for each entry in the AAT (801). In step 2202 the ASID being invalidated is compared with the ASID maintained in the AAT entry (801) specified in step 2201. If they are equal, step 2203 replaces the value maintained in the AAT entry (801) with the unresolved ASID (902) associated with that AAT entry (801). The purpose of an unresolved ASID is to force a page fault the next time a storage access uses the ASID, so that the source architecture rules may be applied at that time to determine the value of the ASID. The value of the unresolved ASID indicates the precise AAT entry (801) into which the newly determined ASID value should be placed. This is discussed for FIG. 26.

Figure 23:
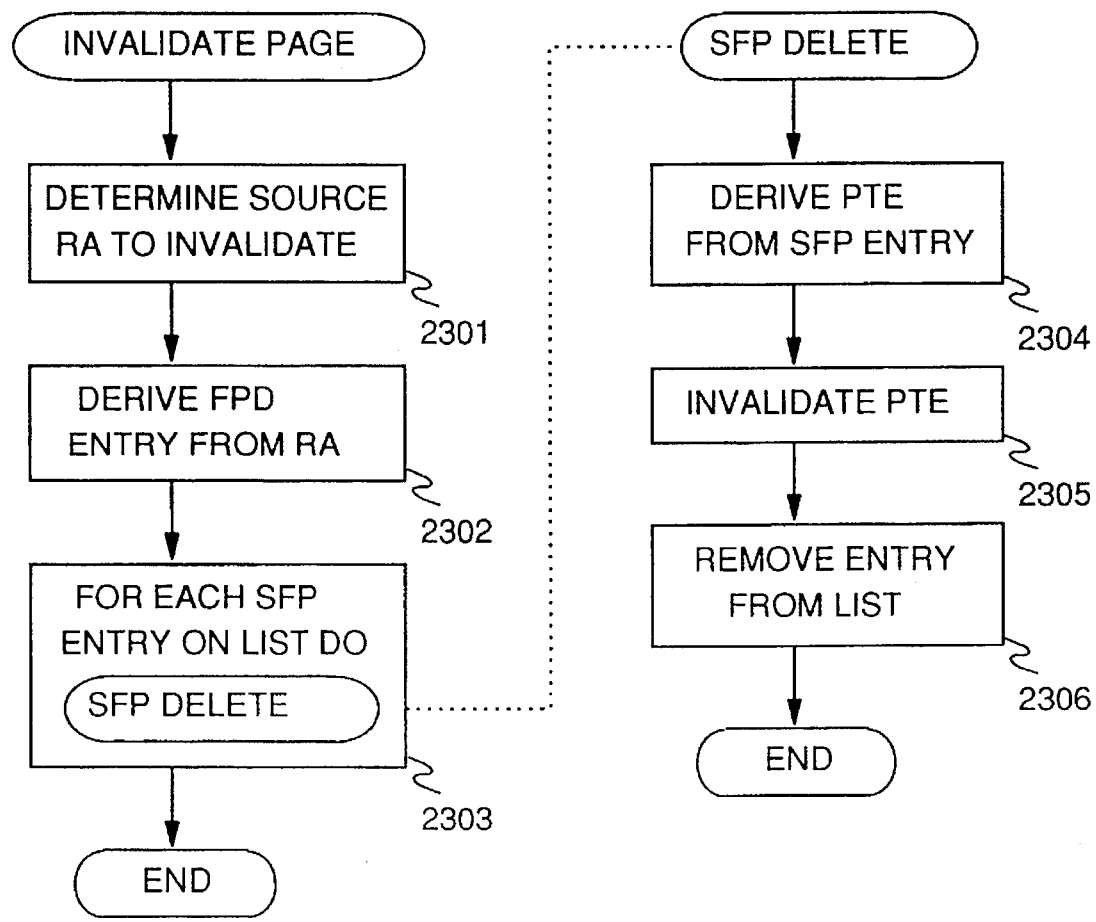
FIG. 23 is a flow diagram of a source page invalidation process.

FIG. 23 shows the target processor logic executed when a source operation results in the invalidation of a source-virtual-to-source-real page mapping, or in the modification of the key value associated with a page of source real storage. Such an action is non-trivial, since it is possible that multiple target virtual page addresses (302 and 303) corresponding to the single source page address (301) may be mapped to the target real page frame (306) containing the source real page frame, all of which must be invalidated in the target page table (entries 304 and 305). To this end, the constructs shown in FIG. 13 are employed as described below. Step 2301 determines the address of the source real page contained in that page frame 306 that is associated with the source page address (301) being invalidated. If necessary, the dynamic address translation rules specified in the source architecture may be applied to make this determination. Step 2302 uses the source real page address (1301) to calculate the corresponding FPD entry (1302) in the source frame-to-PTE-list directory (1307), which contains a pointer to a single-frame-PTE-list, which is found in the single-frame-PTE-list area (1308), which links the PTE's associating the real page with the set of virtual pages which resolve to it. Step 2303 traverses the SFP entries (1303, 1304) on this list, causing steps 2304, 2305, and 2306 to be executed for each SFP entry. Step 2304 calculates the PTE associated with the SFP entry specified in step 2303 (i.e., PTE 1305 for entry 1303, PTE 1306 for entry 1304). Step 2305 invalidates the PTE by clearing the valid bit (1105) in FIG. 11. Step 2306 deletes the SFP entry (1303 or 1304) from the list specified by (1302). Note that in the case of the modification of the key associated with a real storage page, it is possible that this brute force approach of invalidating all virtual pages associated with the real page frame may invalidate some mappings that may still be legal. While it is possible to construct logic which preserves such mappings, such logic is omitted from this embodiment based on the assumption that the additional complexity and path length incurred would not justify the minimal savings.

Figure 24:
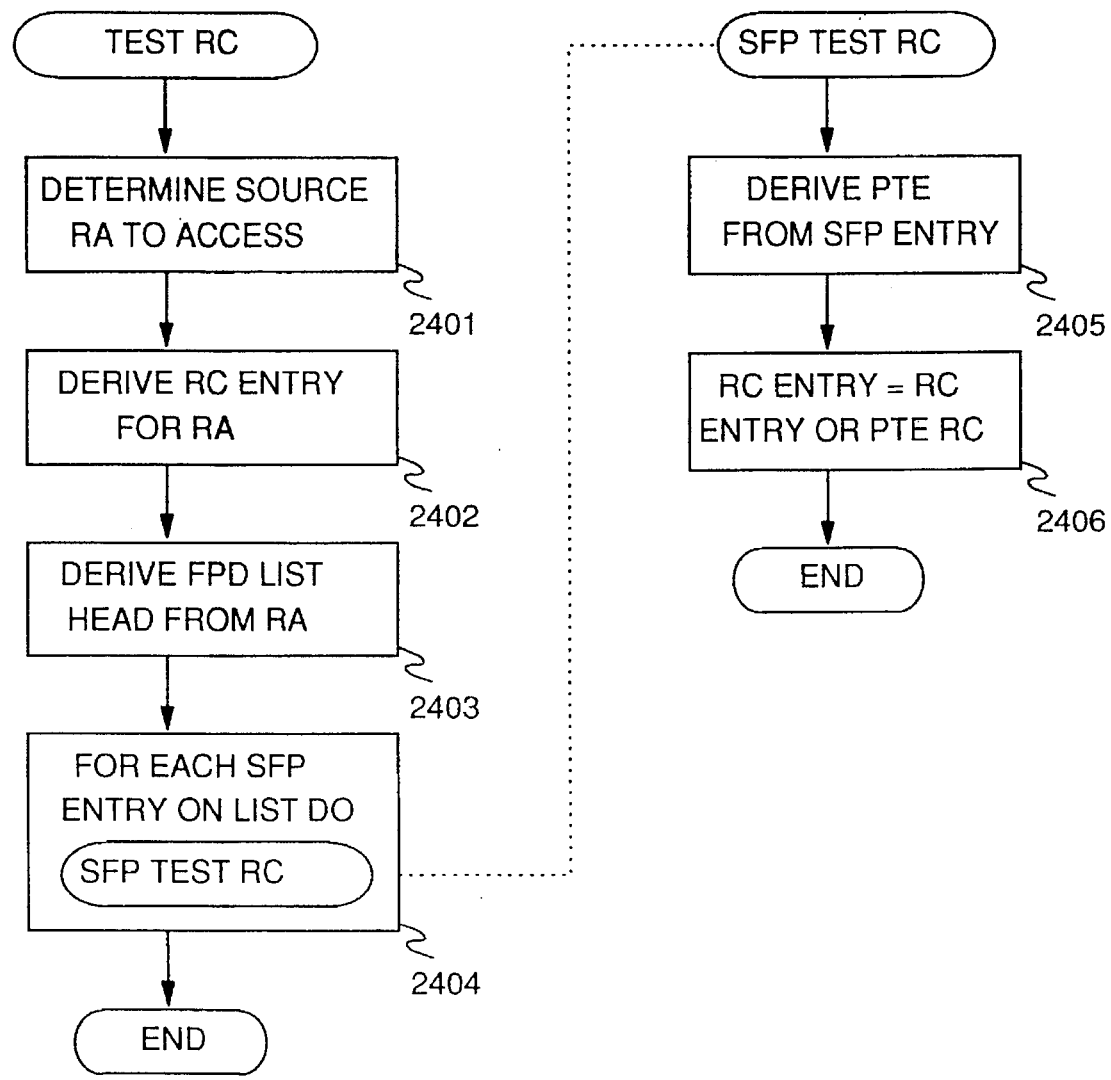
FIG. 24 is a flow diagram of a process for controlling the RC (reference and change) indicator bits associated with a source page frame.

FIG. 24 shows the target processor logic executed when a source operation requires reference or change (RC) information associated with a source real page frame. Such an action is non-trivial, since in this embodiment, the source RC information may be distributed among multiple entities. In the target machine, the RC information for source real storage pages is kept in a table of RC entries. In addition, if the target real page (306) associated with a source real page is mapped by one or more target PTE's (304, 305), the RC information (1103, 1104) in those PTE's must be combined with the information in the page's associated RC entry. To this end, the constructs described in FIG. 13 are employed as described below. Step 2401 determines the address of the source real page contained in target real page frame 306, that is associated with the source page address (301) for which RC information is required. If necessary, the dynamic address translation rules specified in the source architecture may be applied to make this determination. Step 2402 uses the source real page address to calculate the corresponding RC entry in the table that maintains the reference and change information for each page of source real storage. Step 2403 uses the source real page address (1301) to calculate the corresponding FPD entry (1302) in the source frame-to-PTE-list directory (1307), which contains a pointer to a single-frame-PTE-list, which is found in the single-frame-PTE-list area (1308), and links the PTE's associating the real page with the set of virtual pages which resolve to it. Step 2404 traverses the SFP entries (1303, 1304) on this list, causing steps 2405 and 2406 to be executed for each SFP entry. Step 2405 calculates the PTE associated with the SFP entry specified in step 2404 (i.e., PTE 1305 for entry 1303, PTE 1306 for entry 1304). Step 2406 performs a logical OR operation between the contents of the RC entry derived in step 2402, and the RC information (1103, 1104) maintained in the PTE derived in step 2405, placing the results in the RC entry derived in step 2402. After this logic is executed, the source RC information required exists in the RC entry derived in step 2402.

Figure 25:
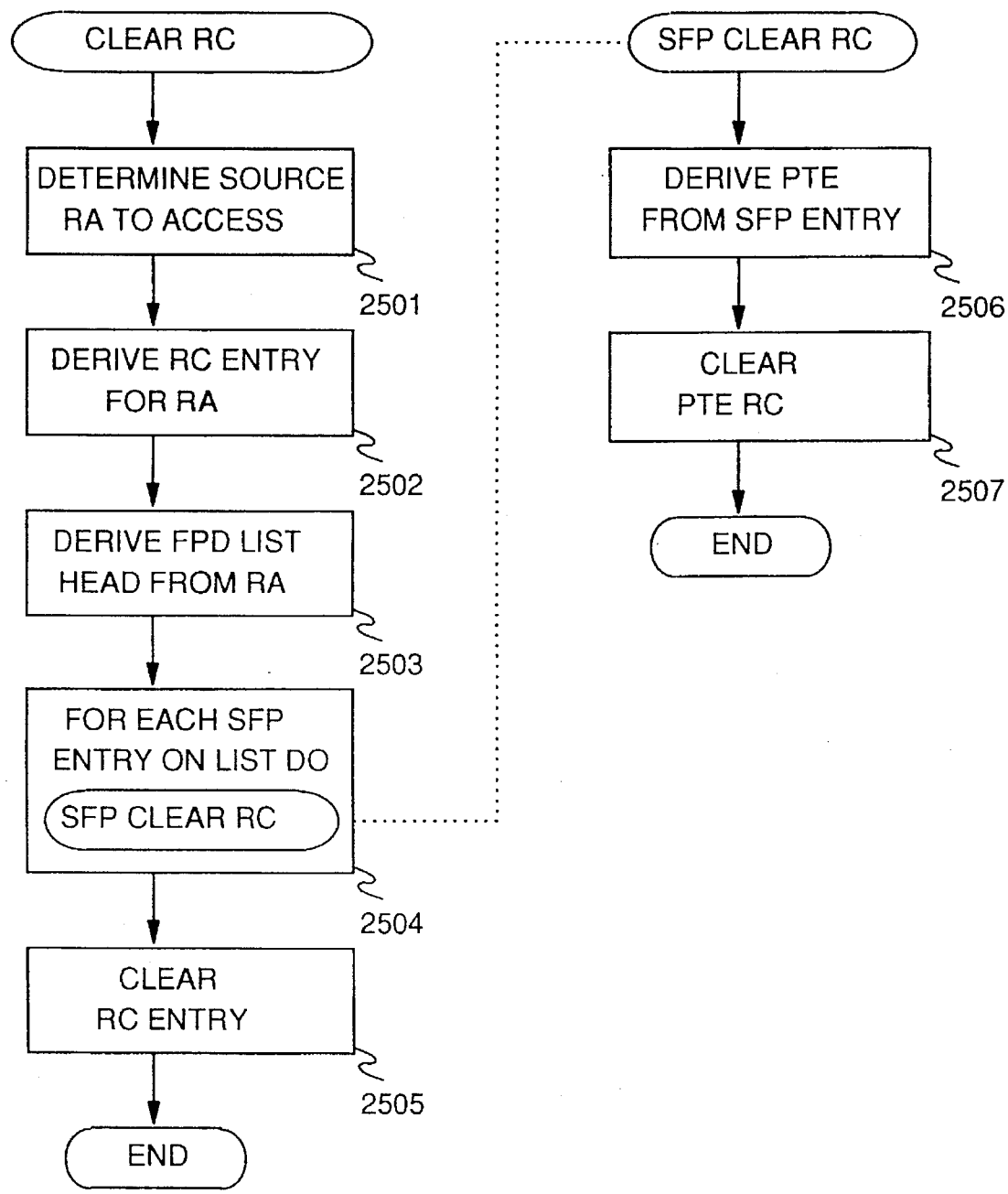
FIG. 25 is a flow diagram of a process for clearing the RC (reference and change) indicator bits associated with a source page frame.

FIG. 25 shows the target processor logic executed when a source operation clears reference or change (RC) information associated with a source real page frame. Such an action is non-trivial, since in this embodiment, the source RC information may be distributed among multiple entities. In the target machine, the RC information for source real storage pages is kept in a table of RC entries. In addition, if the target real page (306) associated with a source real page contained in target real page frame 306 is mapped by one or more target PTE's (304, 305), the RC information (1103, 1104) in those PTE's must be combined with the information in the page's associated RC entry. To this end, the constructs described in FIG. 13 are employed as described below. Step 2501 determines the address of the source real page contained in target real page frame 306 that is associated with the source page (301) for which RC information will be cleared. If necessary, the dynamic address translation rules specified in the source architecture may be applied to make this determination. Step 2502 uses the source real page address to calculate the corresponding entry (RC entry), in the table that maintains the reference and change information for each page of source real storage. Step 2503 uses the source real page address (1301) to calculate the corresponding FPD entry (1302) in the source frame-to-PTE-list directory (1307), which contains a pointer to a single-frame-PTE-list, which is found in the single-frame-PTE-list area (1308), and links the PTE's associating the real page with the set of virtual pages which resolve to it. Step 2504 traverses the SFP entries (1303, 1304) on this list, causing steps 2505 and 2506 to be executed for each SFP entry. Step 2505 calculates the PTE associated with the SFP entry specified in step 2504 (i.e., PTE 1305 for entry 1303, PTE 1306 for entry 1304). Step 2506 clears the RC information (1103, 1104) maintained in the PTE derived in step 2505. After step 2504 has traversed all the SFP entries on the list specified in the FPD entry, step 2507 clears the RC information stored in the RC entry derived in step 2502.

FIG. 26 shows the target processor logic executed when a target page fault occurs (see FIGS. 14, 15, 16, 17 and 18), i.e. when the target page table does not contain a valid PTE mapping the virtual address specified by a storage access. Step 2601 extracts the base offset (601) from the target virtual address (303) which triggered the page fault. Step 2602 determines whether the base offset (601) indicates that the faulting access is associated with a source storage access (it may be associated with a region of target virtual storage that is not allocated to the source). If the page fault is not associated with a source storage access, control is passed to the exception means specified by the target to resolve target page faults. This means is not a subject of this invention. If the page fault is associated with a source storage access, control is passed to step 2603. Step 2603 extracts the ASID (604) from the target virtual address (303) which triggered the page fault. Step 2604 determines whether the ASID (604) belongs to the set of unresolved ASID's (901). If the ASID is not resolved, its value indicates whether it represents, in this embodiment, an unresolved primary, secondary, home, or AR-specified address space. In this case, the source architecture rules are used to determine the resolved ASID for the reference. The corresponding entry in the AAT (FIG. 8) can be set to the newly resolved value. This is discussed more fully in connection with FIGS. 8 and 9. If Step 2604 determines that the ASID (604) does not belong to the set of unresolved ASID's (902), control passes to step 2607. It if does belong, the unresolved ASID must be resolved, and the resolved value must be placed in the AAT entry (801) associated with the unresolved ASID (901), and invokes the appropriate source process (either the inspection of source control registers or the source ART process with an ALET from a source access register), to determine the correct ASID associated with the AAT entry (801). Step 2606 determines one of two possible outcomes of the process invoked in step 2605. If step 2605 results in a source authority violation, control is passed to the appropriate source exception handler, as defined by the source architecture rules. If a valid ASID is determined, its value is placed in the appropriate AAT entry and EVAR's and the source storage access is retried. Step 2607 checks whether the ASID (604) belongs to the set of virtual ASID's (901) (i.e., DAT is on), or if it is the DAT-off ASID (901). In the latter case, control passes to step 2610 because the DAT-off address is the source real address. In the former case control passes to step 2608 to compute the source real address. Step 2608 invokes the source DAT process to determine the source real address. Step 2609 determines one of two possible outcomes of the source DAT process invoked in step 2608. If step 2608 results in a source page fault or source authority violation, control is passed to the appropriate source exception handler, as defined by the source architecture rules. If not, control is passed to step 2610. Step 2610 consults the source storage key array entry associated with the source real page address, to determine the authorization information associated with the source real page. The target machine maintains a source storage key array with an entry for each page frame of target real storage which represents a source real page frame. Step 2611 uses the information in the storage key and the key (602) field in the faulting target virtual address to determine whether or not there is a source storage access violation. If there is, control passes to the appropriate source exception handler, as defined by the source architecture rules. If the storage access is valid, a PTE must be created in the target page table, so that future source storage accesses to this page under this storage access state will proceed with the efficiency of the target DAT mechanism. Then control is passed to the target PTE allocation logic (step 2701).

Figure 27:
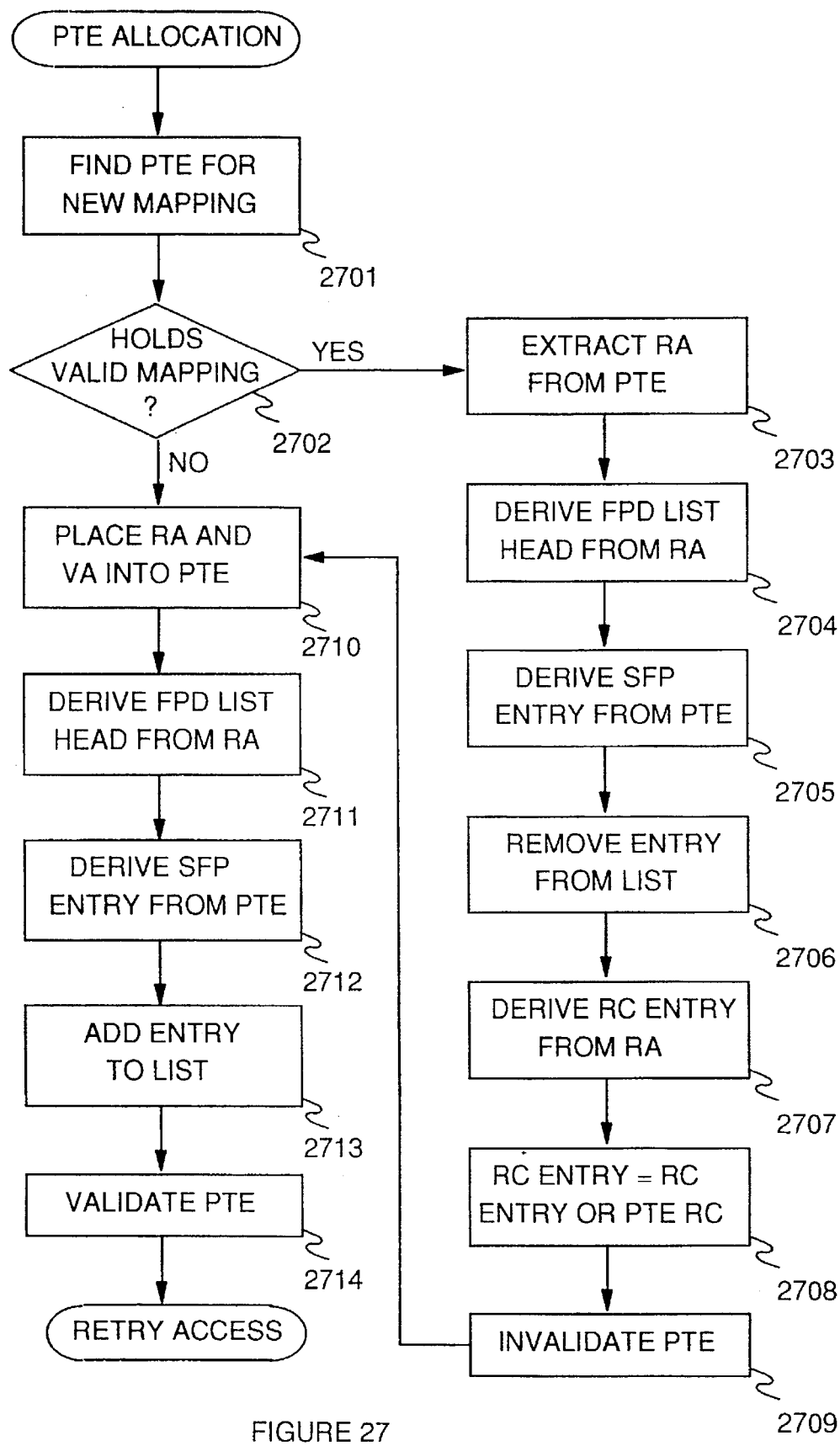
FIG. 27 illustrates the target page frame assignment process for obtaining target real storage for a source page frame in the preferred embodiment.

FIG. 27 shows the target processor logic executed when a PTE for a source-virtual-to-real mapping must be created in the target page table. It is possible that multiple target virtual pages (addresses 302, 303) corresponding to the single source virtual page address (301) may be mapped to a single target real page frame (306) corresponding to a single source real page frame. Thus, when PTEs are allocated or deallocated, they must be added to or removed from the set of synonym mappings associated with a single real page. To this end, the constructs described in FIG. 13 are employed as described below. Step 2701 selects a PTE from the target page table to contain the new mapping. Algorithms for such selection are not a subject of this invention. Step 2702 determines whether or not the PTE chosen in step 2701 already contains a valid mapping, by testing the valid bit (1105) in the PTE. If the PTE contains no mapping (i.e. it is invalid), control passes to step 2710, which will begin the process of placing the new mapping in the PTE. If the PTE already contains a valid mapping, then that mapping must be properly unassigned before the new mapping may be assigned. In this case, control passes to step 2703, which will begin the unassignment process. Step 2703 extracts the target real frame number 1102 from the PTE. From this the source real page address can be determined. Step 2704 uses this source real page address 1301 to calculate the corresponding FPD entry 1302 in the source frame-to-PTE-list directory 1307, which contains a pointer to a single-frame-PTE-list area 1308, and links the PTE's associating the real page with the set of virtual pages which resolve to it. Step 2705 uses the PTE address to calculate which SFP entry is associated with it (i.e., entry 1303 for PTE 1305, entry 1304 for PTE 1306). Step 2706 removes the SFP entry determined in step 2705 from the list specified by the FPD entry determined in step 2704, thus removing the virtual to real mapping in the PTE from the list of such mappings associated with the source real page. Steps 2707 and 2708 are executed to insure that any reference and change information associated with the PTE is not lost. Step 2707 uses the source real page address to calculate the corresponding entry (RC entry), in the table that maintains the reference and change information for each page of source real storage. Step 2708 performs a logical OR operation between the contents of the RC entry derived in step 2707, and the RC information 1103, 1104 maintained in the PTE, placing the results in the RC entry derived in step 2707. Step 2709 invalidates the PTE by clearing its valid bit 1105, completing the unassignment of the old mapping. Step 2710 begins the process of placing the new mapping in the PTE, by placing the target virtual page number and target real frame number into the PTE in fields 1101 and 1102. Step 2711 uses the source real page address 1301 to calculate the corresponding FPD entry 1302 in the source frame-to-PTE-list directory 1307, which contains a pointer to a single-frame-PTE-list, which is found in the single-frame-PTE-list area 1308 and links the PTE's associating the real page with the set of virtual pages which resolve to it. Step 2712 uses the PTE address to calculate which SFP entry is associated with it (i.e. entry 1303 for PTE 1305, entry 1304 for PTE 1306). Step 2713 adds the SFP entry determined in step 2712 to the list specified by the FPD entry determined in step 2711, thus adding the virtual to real mapping in the PTE to the list of such mappings associated with the source real page. Step 2714 validates the PTE by setting its valid bit 1105, completing the assignment to the new mapping. Finally, the source storage access, which caused the original target page fault that caused the execution of this logic, is attempted again.

While the invention has been described in detail herein in accordance with certain embodiments thereof, many modifications and changes therein may be effected by those skilled in the art. Accordingly, it is intended by the appended claims to cover all such modifications and changes as fall within the true spirit and scope of the invention.

Having thus described our invention, what we claim as new and desire to secure by Letters patent is:

1. A method of extending access authority controls in a processor having dynamic address translation (DAT), comprising the following steps for:

generating a source effective address (EA) for accessing data in a source page in a source storage of an executing source program on the processor, the source EA having fewer bits than a target VEA provided to a DAT mechanism in the processor for dynamic address translation, also generating access authority codes (AAC) for identifying particular access authority constraints for an access by a source EA to a source page frame in source real storage, the source page frame being located in a target page frame in a target real storage of the processor, writing the AACs in bits of the target VEA not written into by the source EA for generating the target VEA as a combination of the source EA and the AACs, the bits containing the AACs forming AAC fields respectively containing the access authority codes, the target VEA addressing a target virtual page in target virtual storage, transferring the target VEA to the DAT mechanism, and locating by the DAT mechanism of any valid target page table entry (target PTE) containing an address to a target page frame assigned to the target VEA by a previous translation of the target VEA, and accessing the target page frame to obtain data required by the source VEA, but signalling a target page fault by the DAT mechanism if no valid target PTE is found for the target VEA, then decoding the AACs in the target VEA to determine if any AAC prevents completion of the storage access for the source VEA if no valid target PTE is found for the target VEA, and terminating the access if any AAC prevents completion of the storage access, but if no AAC prevents completion of the storage access, then address translating the target VEA by assigning a page table entry and a target page frame in the target real storage to the target VEA, writing a page frame real address to the target page frame in the target PTE and writing a validation indication in the target PTE to enable it to represent an access with particular access authority constraints for the source page frame in the source virtual storage.

2. A method of extending access authority controls in a processor having dynamic address translation (DAT) as defined in claim 1, further comprising processor steps for:

writing a synonym set of one or more target PTEs each translating to the same target page frame, and the target PTEs in the same synonym set respectively associated with different target virtual addresses having different values in their AAC fields representing accesses with different access authority states.

3. A method of extending access authority controls in a processor having dynamic address translation (DAT) as defined in claim 2, further comprising processor steps for:

setting up a synonym association area and a page frame synonym directory in target virtual storage, the synonym association area containing one synonym pointer entry for each target PTE in the target page table, and the page frame directory containing one directory pointer entry for representing one source page frame in the target real storage, and locating by each directory pointer entry of a synonym set of synonym pointer entries in the synonym association area respectively representing a corresponding set of synonym target PTEs for the same source page frame.

4. A method of extending access authority controls in a processor having dynamic address translation (DAT) as defined in claim 3, further comprising a processor step for:

storing a pointer in each directory pointer entry for addressing a first synonym pointer entry in the set associated with the source page frame represented by the directory pointer entry.

5. A method of extending access authority controls in a processor having dynamic address translation (DAT) as defined in claim 4, further comprising a processor step for:

storing a pointer in each synonym pointer entry for addressing a next synonym pointer entry in the set associated with the source page frame represented by the directory pointer entry.

6. A method of extending access authority controls in a processor having dynamic address translation (DAT) as defined in claim 1, in and unique AAC fields whose processing includes the steps of:

before executing a source program, determining each access authority code for the source program which will not change during execution of the source program, and storing a corresponding non-changeable AAC value recognizable by the target system for each non-changeable AAC found by the determining step, and storing each non-changeable value for preparation of the target VEAs during execution of the source program.

7. A method of extending access authority controls in a processor having dynamic address translation (DAT) as defined in claim 6, further comprising the steps of:

including in the determining step a determination of any storage key as a non-changeable AAC to be used in the execution of the source program, and storing a storage key value, corresponding to a storage key determined by the determining step, in a respective AAC field assigned to receive a storage key constraint value in each target VEA when the target VEA is being generated in the execution of the source program.

8. A method of extending access authority controls in a processor having dynamic address translation (DAT) as defined in claim 6, further comprising the steps of:

including in the determining step a determination of any address space identifier (ASID) as a non-changeable AAC to be used in a later execution of the source program, and storing an ASID value, corresponding to the ASID determined by the determining step, in a respective AAC field assigned to receive an ASID constraint value for the non-changeable AAC in each target VEA when the target VEA is being generated in the execution of the source program.

9. A method of extending access authority controls in a processor having dynamic address translation (DAT) as defined in claim 6, further comprising the steps of:

including in the determining step a determination that DAT is not being used by the source program, and assigning a non-DAT address space identifier (no-DAT ASID) for use as a non-changeable AAC to be used in a later execution of the source program, and storing a non-DAT ASID value, corresponding to the non-DAT determination by the determining step, in a respective AAC field assigned in each target VEA to receive an ASID constraint value for the non-changeable AAC when the target VEA is being generated in the execution of the source program.

10. A method of extending access authority controls in a processor having dynamic address translation (DAT) as defined in claim 1, further comprising the steps of:

determining each changeable AAC during each storage access request, the changeable AAC being changeable for each access during execution by the source program on the target processor, and storing a changeable AAC value corresponding to the changeable AAC for the storage access request in an AAC field reserved for the changeable AAC in the target VEA being generated for the storage access request by the source program.

11. A method of extending access authority controls in a processor having dynamic address translation (DAT) as defined in claim 10, further comprising the steps of:

determining the changeable AAC as being a fetch AAC or store AAC upon each storage access requested by the source program during execution on the target processor, and storing a changeable AAC value corresponding to the fetch AAC or store AAC in an AAC field reserved for the changeable AAC in the target VEA being generated for the storage access request.

12. A method of extending access authority controls in a processor having dynamic address translation (DAT) as defined in claim 1, further comprising the steps of:

before executing a source program, determining any AAC needed for execution of the source program for which the AAC will not change during execution of the source program, storing a non-changeable AAC value, corresponding to the AAC code, recognizable by the target system for each non-changeable AAC found by the determining step, storing each non-changeable value in the target system for later use during execution of the source program when generating the target VEAs, when executing the source program, determining each changeable AAC during each storage access request, the changeable AAC being changeable upon each access during execution by the source program on the target processor, and in a target VEA being generated for each source storage access request, storing in AAC fields reserved for different types of source storage requests the changeable and non-changeable AAC values required for the storage access.

13. A method of extending access authority controls in a processor having dynamic address translation (DAT) as defined in claim 12, further comprising the steps of:

detecting by a DAT mechanism in the target processor for existence of a prior address translation for each generated target VEA, and indicating validity of the target VEA if the prior address translation is found, and if validity is found, using the prior address translation of the target VEA without detecting any AAC value to allow fast accessing of data in the target page frame indicated by the address translation.

14. A method of extending access authority controls in a processor having dynamic address translation (DAT) as defined in claim 13, further comprising the steps of:

detecting by the DAT mechanism in the target processor for existence of a prior address translation for each generated target VEA, and if no prior address translation for the VEA is found, performing the validation of all source access authority control settings in the target VEA, in accordance with source machine architecture rules, and if the access is valid under source access control rules, establishing a PTE to allow the access, and if the access is not valid, communicating the source machine exception to the source program using the architecture specification of the source machine to report the exception.

15. A method of extending access authority controls in a processor having dynamic address translation (DAT) as defined in claim 14, further comprising the steps of:

inserting a base field in each target VEA, the base field containing a target virtual address for locating the start of a source storage area in the target processor's virtual storage.

16. A method of extending access authority controls in a processor having dynamic address translation (DAT) as defined in claim 15, further comprising the steps of:

dividing the target processor's virtual storage into a plurality of source spaces, in which each source space includes at least one type of each different permutation of useable values of all AAC fields in the target VEA.

17. A method of extending access authority controls in a target processor having dynamic address translation (DAT) as defined in claim 15, further comprising the steps of:

dividing part of the target processor's virtual storage into plural versions of a source address space, in which the plural versions each comprise plural representations of the same source address space and a plurality of different permutation of useable values of all AAC fields, the versions including: a resolved version for mapping to real storage space previously accessed units of the source virtual address space and its AAC permutations, an unresolved version not mapping to real storage space previously defined units of the source virtual address space and its AAC permutations, and a third real address version of the target virtual address space representing real source address space for containing source program data obtained by using real source addresses.

18. A method of extending access authority controls in a processor having dynamic address translation (DAT) as defined in claim 17, further comprising the steps of:

changing a unique source address space identifier (ASID) for each source address space to the resolved version from the unresolved version for which the source program specifies a virtual address, the determining step locating a target translation table for mapping units of the source virtual address space into units of target real storage to resolve a representation of the source ASID in the target translation table, and assigning another representation in the target translation table for source real addresses in the real address version not having a source ASID and not having any source virtual address space.

19. A method of extending access authority controls in a processor having dynamic address translation (DAT) as defined in claim 18, further comprising the steps of:

executing the source program with: 1) resolved source ASIDs in the resolved version, and 2) token representations of source ASIDs being resolved by the changing step, and 3) source real addresses not having any ASID or token representation of any source ASID, the resolved and unresolved source ASIDs having assigned sets of contiguous storage unit entries in the target translation table to the source ASID, dynamically resolving any token representation of a source ASID by assignment of a set of contiguous storage unit entries in the target translation table, and assigning a set of contiguous storage unit entries in the target translation table to source real storage units of any source real storage needed to execute the source program.

20. A method of extending access authority controls in a processor having dynamic address translation (DAT) as defined in claim 19, further comprising the steps of:

assigning different contiguous parts of the target translation table to the same source storage unit having different combinations of access states and the same ASID, and also assigning a different contiguous part of the target translation table to the real address version for representing any source real storage needed to execute the source program.

* * * * *